(12) United States Patent
Sun et al.

(10) Patent No.: US 11,348,230 B2
(45) Date of Patent: May 31, 2022

(54) SYSTEMS AND METHODS FOR GENERATING AND TRACKING SHAPES OF A TARGET

(71) Applicant: SHANGHAI UNITED IMAGING INTELLIGENCE CO., LTD., Shanghai (CN)

(72) Inventors: Shanhui Sun, Cambridge, MA (US); Zhang Chen, Cambridge, MA (US); Terrence Chen, Cambridge, MA (US)

(73) Assignee: SHANGHAI UNITED IMAGING INTELLIGENCE CO., LTD., Shanghai (CN)

( * ) Notice: Subject to any disclaimer, the term of this patent is extended or adjusted under 35 U.S.C. 154(b) by 280 days.

(21) Appl. No.: 16/664,710

(22) Filed: Oct. 25, 2019

(65) Prior Publication Data
US 2021/0125331 A1    Apr. 29, 2021

(51) Int. Cl.
*G06T 7/00*        (2017.01)
*G06T 7/136*      (2017.01)
(Continued)

(52) U.S. Cl.
CPC ............ *G06T 7/0012* (2013.01); *G06N 20/00* (2019.01); *G06T 7/11* (2017.01); *G06T 7/136* (2017.01);
(Continued)

(58) Field of Classification Search
CPC ......... G06T 7/0012; G06T 7/136; G06T 7/11; G06T 7/143; G06T 7/149; G06T 7/246; G06T 7/251; G06T 2207/04; G06T 2207/10016; G06T 2207/10072; G06T 2207/10081; G06T 2207/10088;
(Continued)

(56) References Cited

U.S. PATENT DOCUMENTS

2006/0074292 A1*   4/2006   Thomson ............. A61B 6/5217
                                                                   600/411
2009/0048506 A1*   2/2009   Fong-Ichimura ...... A61B 5/055
                                                                   600/411

(Continued)

OTHER PUBLICATIONS

Jinming Duan et al., Automatic 3D bi-ventricular segmentation of cardiac images by a shape-refined multi-task deep learning approach, IEEE, Transactions on Medical Imaging, 13 pages, 2019.
(Continued)

*Primary Examiner* — Nay A Maung
*Assistant Examiner* — Jose M Torres
(74) *Attorney, Agent, or Firm* — Metis IP LLC

(57) ABSTRACT

Systems and methods for generating and tracking shapes of a target may be provided. The method may include obtaining at least one first resolution image corresponding to at least one of a sequence of time frames of a medical scan. The method may include determining, according to a predictive model, one or more shape parameters regarding a shape of a target from the at least one first resolution image. The method may include determining, based on the one or more shape parameters and a shape model, at least one shape of the target from the at least one first resolution image. The method may further include generating a second resolution visual representation of the target by rendering the determined shape of the target.

20 Claims, 15 Drawing Sheets

(51) Int. Cl.
*G06T 7/11* (2017.01)
*G06T 7/246* (2017.01)
*G06N 20/00* (2019.01)
*G06V 10/40* (2022.01)
*G06V 10/46* (2022.01)

(52) U.S. Cl.
CPC .............. *G06T 7/251* (2017.01); *G06V 10/40* (2022.01); *G06T 2207/10016* (2013.01); *G06T 2207/30004* (2013.01); *G06V 10/476* (2022.01)

(58) Field of Classification Search
CPC . G06T 2207/20076; G06T 2207/20081; G06T 2207/20084; G06T 2207/30004; G06T 2207/30048; G06N 20/00; G06K 9/46; G06K 9/468; G06K 9/6247; G06K 2009/051; G06K 2009/487
See application file for complete search history.

(56) References Cited

U.S. PATENT DOCUMENTS

| | | | |
|---|---|---|---|
| 2012/0078097 A1* | 3/2012 | Wang | A61B 8/483 600/437 |
| 2015/0010223 A1* | 1/2015 | Sapiro | A61B 6/501 382/131 |
| 2015/0030219 A1* | 1/2015 | Madabhushi | G06T 7/149 382/128 |
| 2016/0063726 A1* | 3/2016 | Wenzel | G06T 7/12 382/128 |
| 2020/0090345 A1* | 3/2020 | Krebs | A61B 5/1116 |

OTHER PUBLICATIONS

Max Jaderberg et al., Spatial Transformer Networks, Computer Science, Published in NIPS, 9 pages, 2015.

* cited by examiner

SYSTEMS AND METHODS FOR GENERATING AND TRACKING SHAPES OF A TARGET

TECHNICAL FIELD

This disclosure generally relates to image processing technology, and more particularly, to systems and methods for generating and tracking shapes of a target represented in a medical image.

BACKGROUND

Imaging systems, such as, a magnetic resonance imaging (MRI) system or a computed tomography (CT) system, are widely used in medical diagnosis and/or treatment. The imaging system may provide high-resolution (HR) images and/or low-resolution (LR) images. The images may be two-dimensional (2D) images or three-dimensional (3D) images. In contrast to LR images, HR images may provide rich diagnosis information. Taking a cardiac magnetic resonance (CMR) imaging as an example, HR volumetric CMR (e.g., HR 3D CMR) can provide rich diagnosis information for cardiovascular diseases. However, the HR CMR usually takes a longer acquisition time than the LR CMR. Clinically, it is a challenging task to acquire HR CMR since a patient needs to hold his/her breath for a long time and it compromises in-plane image quality to achieve faster acquisition. Low slice resolution CMR, such as 2D multi-slice imaging, is well accepted in clinical applications. However, 2D multi-slice LR imaging may include some drawbacks, such as inter-slice shifts due to respiratory motion, cardiac motion, patient motion as well as noisy ECG gating, a large slice thickness, and a lack of slice coverage at the apical region of the 3D model due to incomplete slice coverage of the whole heart. In some cases, a 2D segmentation algorithm for a target (e.g., the heart) in the LR image may produce high resolution in-plane segmentation; however, it is unable to avoid aforementioned problems. Directly performing 3D segmentation (e.g., a deep learning-based 3D segmentation algorithm) may need out-plane interpolation that may over-smooth a surface to mitigate slice artifacts, which in turn may result in a large amount of computation. In some cases, for some targets that undergoes motion (e.g., a heart or a lung), a shape of the target may be different at different time points. Diagnosis information (e.g., estimation of myocardial strain) may also be obtained by tracking the shapes of the target at different time points. For example, the strain estimation may facilitate the understanding of myocardium contraction and relaxation. Therefore, it is desirable to provide systems and/or methods for generating HR segmentation of a target from an LR image and tracking the shape of a target based on the HR segmentation, so as to provide an accurate estimation or representation of the target and maintain a high-efficiency imaging.

SUMMARY

In a first aspect of the present disclosure, a method for generating and tracking shapes of a target is provided. The method may include may include one or more operations. The one or more operations may be implemented on a computing device having at least one processor and at least one computer-readable storage medium. The at least one processor may obtain at least one first resolution image corresponding to at least one of a sequence of time frames of a medical scan. The at least one processor may determine, according to a predictive model, one or more shape parameters regarding a shape of a target from the at least one first resolution image. The one or more shape parameters may include at least one shape variance coefficient and at least one pose transformation parameter. The at least one processor may determine, based on the one or more shape parameters and a shape model, at least one shape of the target from the at least one first resolution image.

In some embodiments, the at least one processor may further generate a second resolution visual representation of the target by rendering the determined shape of the target.

In some embodiments, the at least one pose transformation parameter may include at least one of a translation coefficient, a rotation coefficient, or a scale coefficient.

In some embodiments, the at least one processor may further determine the at least one shape variance coefficient and the at least one pose transformation parameter simultaneously using the predictive model.

In some embodiments, the predictive model may include a first predictive sub-model and a second predictive sub-model. The at least one processor may determine the at least one pose transformation parameter using the first predictive sub-model, and determine the at least one shape variance coefficient using the second predictive sub-model.

In some embodiments, the predictive model may be generated by training an initial model based on a plurality of pairs of data, each of the plurality of pairs of data including a first resolution sample image and a second resolution mesh surface corresponding to the first resolution sample image.

In some embodiments, the at least one processor may input the plurality of pairs of data to the initial model. The at least one processor may perform an iterative process including one or more iterations, each of which includes updating parameters of the initial model by minimizing a loss function of the initial model that includes the updated parameters. The at least one processor may designate the trained initial model as the predictive model.

In some embodiments, each of the one or more iterations may further include assessing whether a termination condition is satisfied.

In some embodiments, the termination condition may include at least one of: that the loss function of the initial model that includes the updated parameters falls below a first threshold, that an iteration count of the iterative process exceeds a second threshold, or that the loss function of the initial model that includes the updated parameters converges.

In some embodiments, the predictive model may include a machine learning regression model.

In some embodiments, the predictive model may include a convolutional neural network (CNN) model.

In some embodiments, the shape model may be described via the one or more shape parameters regarding the shape of the target, a mean shape, and a first eigen vector matrix associated with a shape covariance matrix.

In some embodiments, the at least one processor may track a change of the shape of the target over time.

In some embodiments, the at least one processor may determine, based on a shape of the target corresponding to a preceding time frame N−1 and a motion model of the target, a shape of the target corresponding to a time frame N, wherein N is an integer equal to or greater than 2.

In some embodiments, the motion model of the target may be described via motion parameters, a mean motion, and a second eigen vector matrix associated with a motion covariance matrix.

In some embodiments, the at least one processor may generate the motion parameters using a second predictive model. The second predictive model may be generated by training a second initial model based on a plurality of image pairs, each of the plurality of image pairs including a first first resolution (FR) image corresponding to a previous time frame M−1 and a second first resolution (FR) image corresponding to a time frame M, M being an integer equal to or greater than 2.

In some embodiments, the at least one processor may input the plurality of image pairs to the second initial model. The at least one processor may perform an iterative process including one or more iterations, each of which includes updating parameters of the second initial model by minimizing a second loss function of the second initial model that includes the updated parameters. The at least one processor may designate the trained second initial model as the second predictive model.

In some embodiments, each of the one or more iterations may further include assessing whether a second termination condition is satisfied.

In some embodiments, the second termination condition may include at least one of: that the loss function of the second initial model that includes the updated parameters falls below a third threshold, that an iteration count of the iterative process exceeds a fourth threshold, or that the loss function of the second initial model that includes the updated parameters converges.

In some embodiments, the second predictive model may include a second machine learning regression model.

In some embodiments, the second predictive model may include a second convolutional neural network (CNN) model.

In a second aspect of the present disclosure, a system for generating and tracking shapes of a target is provided. The system may include at least one storage device storing executable instructions and at least one processor in communication with the at least one storage device. When executing the executable instructions, the at least one processor may cause the system to perform one or more operations as the following. The system may obtain at least one first resolution image corresponding to at least one of a sequence of time frames of a medical scan. The system may determine, according to a predictive model, one or more shape parameters regarding a shape of a target from the at least one first resolution image. The one or more shape parameters may include at least one shape variance coefficient and at least one pose transformation parameter. The system may determine, based on the one or more shape parameters and a shape model, at least one shape of the target from the at least one first resolution image.

In a third a second aspect of the present disclosure, a non-transitory computer-readable medium is provided. The non-transitory computer-readable medium includes at least one set of instructions. When the at least one set of instructions are executed by at least one processor of a computer device, the at least one set of instructions directs the at least one processor to perform one or more operations as the following. The at least one processor may obtain at least one first resolution image corresponding to at least one of a sequence of time frames of a medical scan. The at least one processor may determine, according to a predictive model, one or more shape parameters regarding a shape of a target from the at least one first resolution image. The one or more shape parameters may include at least one shape variance coefficient and at least one pose transformation parameter. The at least one processor may determine, based on the one or more shape parameters and a shape model, at least one shape of the target from the at least one first resolution image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by another expression if they may achieve the same purpose.

Figure 3:
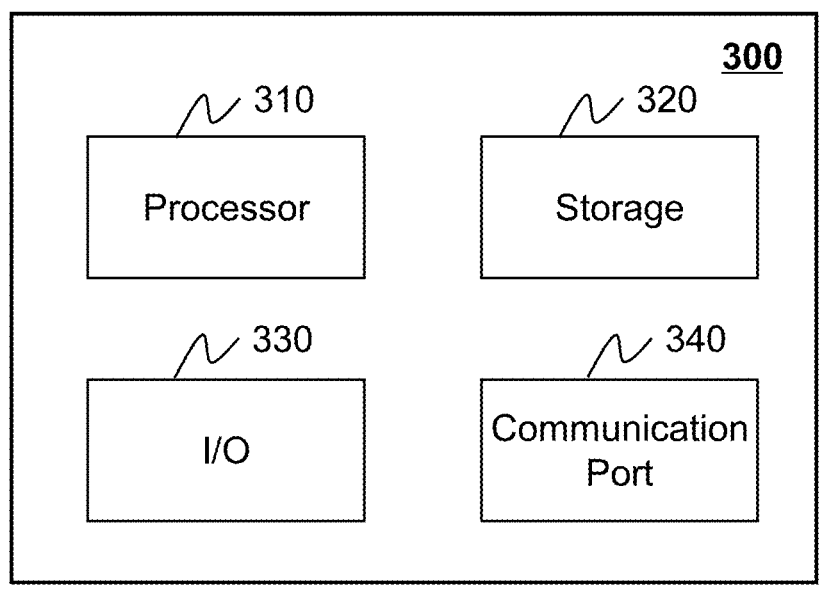
FIG. 3 is a schematic diagram illustrating exemplary hardware and/or software components of a computing device on which the processing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 310 as illustrated in FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an Erasable Programmable Read Only Memory (EPROM). It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for medical imaging and/or medical treatment. In some embodiments, the medical system may include an imaging system. The imaging system may include a single modality imaging system and/or a multi-modality imaging system. The single modality imaging system may include, for example, a magnetic resonance imaging (MRI) system. Exemplary MRI systems may include a superconducting magnetic resonance imaging system, a non-superconducting magnetic resonance imaging system, etc. The multi-modality imaging system may include, for example, a computed tomography-magnetic resonance imaging (MRI-CT) system, a positron emission tomography-magnetic resonance imaging (PET-MRI) system, a single photon emission computed tomography-magnetic resonance imaging (SPECT-MRI) system, a digital subtraction angiography-magnetic resonance imaging (DSA-MRI) system, etc. In some embodiments, the medical system may include a treatment system. The treatment system may include a treatment plan system (TPS), image-guide radiotherapy (IGRT), etc. The image-guide radiotherapy (IGRT) may include a treatment device and an imaging device. The treatment device may include a linear accelerator, a cyclotron, a synchrotron, etc., configured to perform a radio therapy on a subject. The treatment device may include an accelerator of species of particles including, for example, photons, electrons, protons, or heavy ions. The imaging device may include an MRI scanner, a CT scanner (e.g., cone beam computed tomography (CBCT) scanner), a digital radiology (DR) scanner, an electronic portal imaging device (EPID), etc.

Various embodiments of the present disclosure may be provided as systems and methods for generating and tracking shapes of a target. In some embodiments, the system may generate a second resolution segmentation of the target from a first resolution image. In some embodiments, the first resolution may be equal to the second resolution. In some embodiments, the first resolution may be different from the second resolution. For example, the first resolution is lower than the second resolution. The first resolution image may be deemed as a low-resolution (LR) image. The generated second resolution segmentation may be deemed as a high-resolution (HR) segmentation. The system may generate high-resolution (HR) segmentation of the target from a low-resolution (LR) image. For example, the system may generate one or more shape parameters by processing a first resolution image (e.g., an LR image) with a first predictive model (e.g., a target shape parameter predictive model (SPPM) described herein). The one or more shape parameters may include a shape variance and/or at least one pose transformation parameter. The pose transformation parameter may be an affine transformation parameter. In some embodiments, the first predictive model may be a single machine learning regression model (e.g., a CNN model). The first predictive model may be generated by training a first initial model (e.g., an initial SPPM). The first predictive model may be used to predict the shape variance and/or the at least one pose transformation parameter. In some embodiments, the first predictive model may be an end-to-end network model, including a first predictive sub-model and a second predictive sub-model. The first predictive sub-model may be generated by training an initial pose transformation parameter predictive model and the second predictive sub-model may be generated by training an initial shape variance predictive model. The first predictive sub-model may be used to predict the at least one pose transformation parameter, and the second predictive sub-model may be used to predict the shape variance. The system may determine, based on the one or more shape parameters and a shape model, the shape of the target. In some embodiments, the shape model may be described via a mean shape, a shape covariance matrix derived eigen vector matrix, and the one or more shape parameters (e.g., Equation (1)). The system may further generate a second resolution visual representation (e.g., an HR visual 3D shape model) of the target by rendering the determined shape. In some embodiments, the system may generate HR segmentation of the target from an LR image. The system may provide a visualization of the target (e.g., the heart) and allow accurate assessment of the target (e.g., a cardiovascular physiology).

Taking a cine MRI as an example, the cine MRI may provide an image sequence including a plurality of first resolution image frames (e.g., 3D CMR volumes) at different time points (e.g., at different cardiac phases). In some embodiments, each of the plurality of first resolution image frames may include a plurality of slice images generated using the 2D imaging. In some embodiments, the system may determine or segment the shape of the target from the plurality of first resolution image frames by adapting the first predictive model and the shape model described herein. In some embodiments, for a target that undergoes a motion (e.g., the heart or a lung), the shape of the target may vary over time. The shapes of the target at different time frames may be different. The system may track a change of the shape of the target over time in order to achieve the segmentations of target in the entire or a portion of the image sequence of the plurality of image frames. As used herein, a representation of a subject (e.g., a patient) or a portion thereof in an image may be referred to the subject or a portion thereof for brevity. For instance, a representation of a target (e.g., the heart, the liver, a lung, etc., of a patient) in an image may be referred to as the target for brevity. As used herein, an operation on a representation of a target in an image may be referred to as an operation on the target for brevity. For instance, a segmentation of a portion of an image including a representation of a target (e.g., the heart, the liver, a lung, etc., of a patient) from the image may be referred to as a segmentation of the target for brevity. The system may propagate the segmentation of a previous image frame to the segmentation of a current image frame. For example, the system may first determine a first shape of the target in the first image frame of the image sequence, the system may determine a second shape of the target in the second image frame of the image sequence based on the first shape and a motion model (e.g., Equation (8)). Accordingly, the system may sequentially determine the shapes of the target in subsequent image frames. The motion model may be used to track the change of the shape of the target over two consecutive image frames. The motion model may be described in terms of motion parameters, a mean motion, and a motion covariance matrix derived eigen vector matrix. In some embodiments, the motion parameters may be determined according to a second predictive model (e.g., a target motion parameter predictive model (MPPM) described herein). The second predictive model may be generated by training a second initial model (e.g., an initial MPPM).

The following description is provided with reference to exemplary embodiments that the MRI system unless otherwise stated. However, it is understood that it is for illustration purposes only and not intended to limit the scope of the present disclosure. The systems and methods disclosed herein may be suitable for other imaging techniques (e.g., CT). Merely by way of example, a CT system may generate HR segmentation of a target from a first resolution CT image (e.g., an LR CT image) based on an adapted first predictive model and shape model as disclosed herein. The CT system may generate a second resolution segmentation (e.g., an HR segmentation) of the target from a first resolution CT image sequence (e.g., an LR CT image sequence) based on an adapted second predictive model and motion model.

It should be noted that embodiments of the present disclosure relate to the generation of HR segmentation of a target from an LR image (or an LR image sequence) using corresponding predictive models, shape model, and/or motion model. The systems and methods according to some embodiments of the present disclosure may also be applied to an HR image (or an HR image sequence). For example, the system may also generate segmentation of a target from an HR image (or an HR image sequence) using the same or similar predictive model(s), shape model(s), and/or motion model(s).

Figure 1:
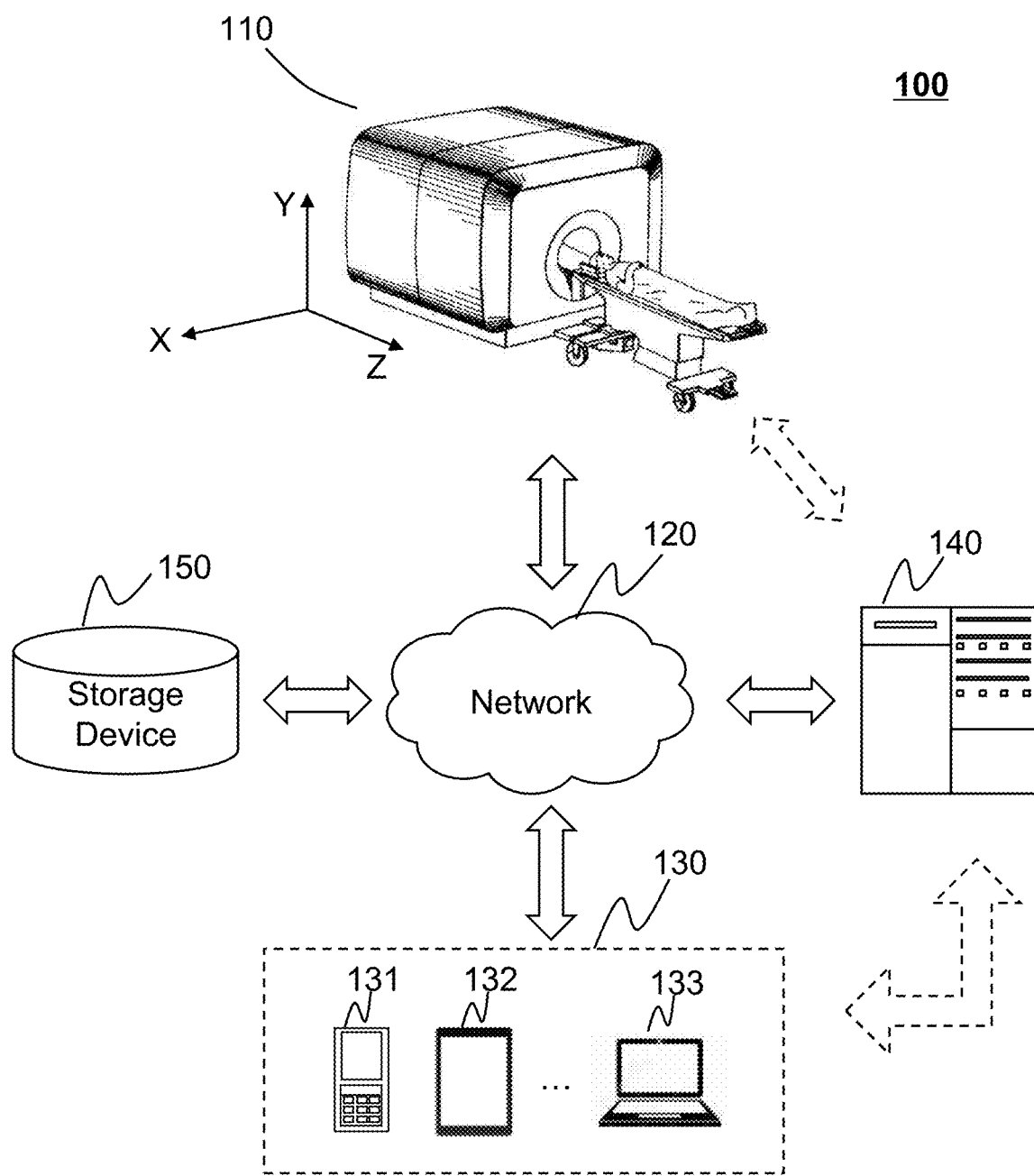
FIG. 1 is a schematic diagram illustrating an exemplary imaging system according to some embodiments of the present disclosure.

FIG. 1 is a schematic diagram illustrating an exemplary imaging system according to some embodiments of the present disclosure. As illustrated, imaging system 100 may include a scanner 110, a network 120, a terminal 130, a processing device 140, and a storage device 150. The components of the imaging system 100 may be connected in one or more of various ways. Mere by way of example, as illustrated in FIG. 1, the scanner 110 may be connected to the processing device 140 through the network 120. As another example, the scanner 110 may be connected to the processing device 140 directly (as indicated by the bi-directional arrow in dotted lines linking the scanner 110 and the processing device 140). As a further example, the storage device 150 may be connected to the processing device 140 directly or through the network 120. As still a further example, a terminal device (e.g., 131, 132, 133, etc.) may be connected to the processing device 140 directly (as indicated by the bi-directional arrow in dotted lines linking the terminal 130 and the processing device 140) or through the network 120.

The scanner 110 may scan an object located within its detection region and generate a plurality of data relating to the object. In the present disclosure, "subject" and "object" are used interchangeably. Mere by way of example, the object may include a patient, a man-made object, etc. As another example, the object may include a specific portion, organ, and/or tissue of a patient. For example, the object may include head, brain, neck, body, shoulder, arm, thorax, heart, stomach, blood vessel, soft tissue, knee, feet, or the like, or any combination thereof. In some embodiments, the scanner 110 may be a close-bore scanner or an open-bore scanner. In the present disclosure, the X axis, the Y axis, and the Z axis shown in FIG. 1 may form an orthogonal coordinate system. The X axis and the Z axis shown in FIG. 1 may be horizontal, and the Y axis may be vertical. As illustrated, the positive X direction along the X axis may be from the right side to the left side of the MRI scanner 110 seen from the direction facing the front of the MRI scanner 110; the positive Y direction along the Y axis shown in FIG. 1 may be from the lower part to the upper part of the MRI scanner 110; the positive Z direction along the Z axis shown in FIG. 1 may refer to a direction in which the object is moved out of the scanning channel (or referred to as the bore) of the scanner 110. More description of the scanner 110 may be found elsewhere in the present disclosure. See, e.g., FIG. 2 and the description thereof.

The network 120 may include any suitable network that can facilitate the exchange of information and/or data for the imaging system 100. In some embodiments, one or more components of the imaging system 100 (e.g., the scanner 110, the terminal 130, the processing device 140, or the storage device 150) may communicate information and/or data with one or more other components of the imaging system 100 via the network 120. For example, the processing device 140 may obtain a plurality of MR images corresponding to a sequence of time frames from the storage device 150 via the network 120. In some embodiments, the network 120 may be any type of wired or wireless network, or a combination thereof. The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a Zig-Bee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the MRI system 100 may be connected to the network 120 to exchange data and/or information.

The terminal 130 may include a mobile device 131, a tablet computer 132, a laptop computer 133, or the like, or any combination thereof. In some embodiments, the mobile device 131 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, smart footgear, a pair of smart glasses, a smart helmet, a smart watch, smart clothing, a smart backpack, a smart accessory, or the like, or any combination thereof. In some embodiments, the smart mobile device may include a smartphone, a personal digital assistant (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a Hololens, a Gear VR, etc. In some embodiments, the terminal 130 may remotely operate the MRI scanner 110 and/or the processing device 140. In some embodiments, the terminal 130 may operate the scanner 110 and/or the processing device 140 via a wireless connection. In some embodiments, the terminal 130 may receive information and/or instructions inputted by a user, and send the received information and/or instructions to the scanner 110 or to the processing device 140 via the network 120. In some embodiments, the terminal 130 may receive data and/or information from the processing device 140. In some embodiments, the terminal 130 may be part of the processing device 140. In some embodiments, the terminal 130 may be omitted.

The processing device 140 may process data and/or information obtained from the MRI scanner 110, the terminal 130, and/or the storage device 150. For example, the processing device 140 may obtain, from the storage device 150 or the scanner 110, at least one first resolution image corresponding to at least one of a sequence of time frames of a medical scan (e.g., an MRI scan). The processing device 140 may determine at least one shape of a target from the at least one first resolution image. As another example, the processing device 140 may obtain one or more trained machine learning models (e.g., the SPPM and the MPPM). The one or more trained machine learning model each may be updated from time to time, e.g., periodically or not, based on a sample set that is at least partially different from the original sample set from which the original trained machine learning model is determined. For instance, the trained machine learning model may be updated based on a sample set including new samples that are not in the original sample set, samples processed using the machine learning model in connection with the original trained machine learning model of a prior version, or the like, or a combination thereof. In some embodiments, the determination and/or updating of the trained machine learning model may be performed on a processing device, while the application of the trained machine learning model may be performed on a different processing device. In some embodiments, the determination and/or updating of the trained machine learning model may be performed on a processing device of a system different than the imaging system 100 or a server different than a server including the processing device 140 on which the application of the trained machine learning model is performed. For instance, the determination and/or updating of the trained machine learning model may be performed on a first system of a vendor who provides and/or maintains such a machine learning model and/or has access to training samples used to determine and/or update the trained machine learning model, while image reconstruction based on the provided machine learning model may be performed on a second system of a client of the vendor. In some embodiments, the determination and/or updating of the trained machine learning model may be performed online in response to a request for target segmentation. In some embodiments, the determination and/or updating of the trained machine learning model may be performed offline.

In some embodiments, the processing device 140 may be a single server, or a server group. The server group may be centralized or distributed. In some embodiments, the processing device 140 may be local or remote. For example, the processing device 140 may access information and/or data stored in or acquired by the scanner 110, the terminal 130, and/or the storage device 150 via the network 120. As another example, the processing device 140 may be directly connected to the scanner 110 (as illustrated by the bidirectional arrow in dashed lines connecting the processing device 140 and the scanner 110 in FIG. 1), the terminal 130 (as illustrated by the bidirectional arrow in dashed lines connecting the processing device 140 and the terminal 130 in FIG. 1), and/or the storage device 150 to access stored or acquired information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the processing device 140 may be implemented on a computing device 300 having one or more components illustrated in FIG. 3 in the present disclosure.

The storage device 150 may store data and/or instructions. In some embodiments, the storage device 150 may store data obtained from the scanner 110, the terminal 130 and/or the processing device 140. For example, the storage device 150 may store a plurality of images acquired by the scanner 110. As another example, the storage device 150 may store one or more predictive models for generating a second resolution segmentation (i.e., a shape of the target with a second resolution) and/or tracking correspondence of multiple shapes corresponding to a sequence of time frames. In some embodiments, the storage device 150 may store data and/or instructions that the processing device 140 may execute or use to perform exemplary methods described in the present disclosure. For example, the storage device 150 may store instructions that the processing device 140 may execute to perform one or more operations for generating and/or tracking shapes of a target. In some embodiments, the storage device 150 may include a mass storage device, a removable storage device, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more components of the imaging system 100 (e.g., the scanner 110, the processing device 140, the terminal 130, etc.). One or more components of the imaging system 100 may access the data or instructions stored in the storage device 150 via the network 120. In some embodiments, the storage device 150 may be directly connected to or communicate with one or more components of the imaging system 100 (e.g., the scanner 110, the processing device 140, the terminal 130, etc.). In some embodiments, the storage device 150 may be part of the processing device 140.

In some embodiments, the imaging system 100 may further include one or more power supplies (not shown in FIG. 1) connected to one or more components of the imaging system 100 (e.g., the scanner 110, the processing device 140, the terminal 130, the storage device 150, etc.).

Figure 2:
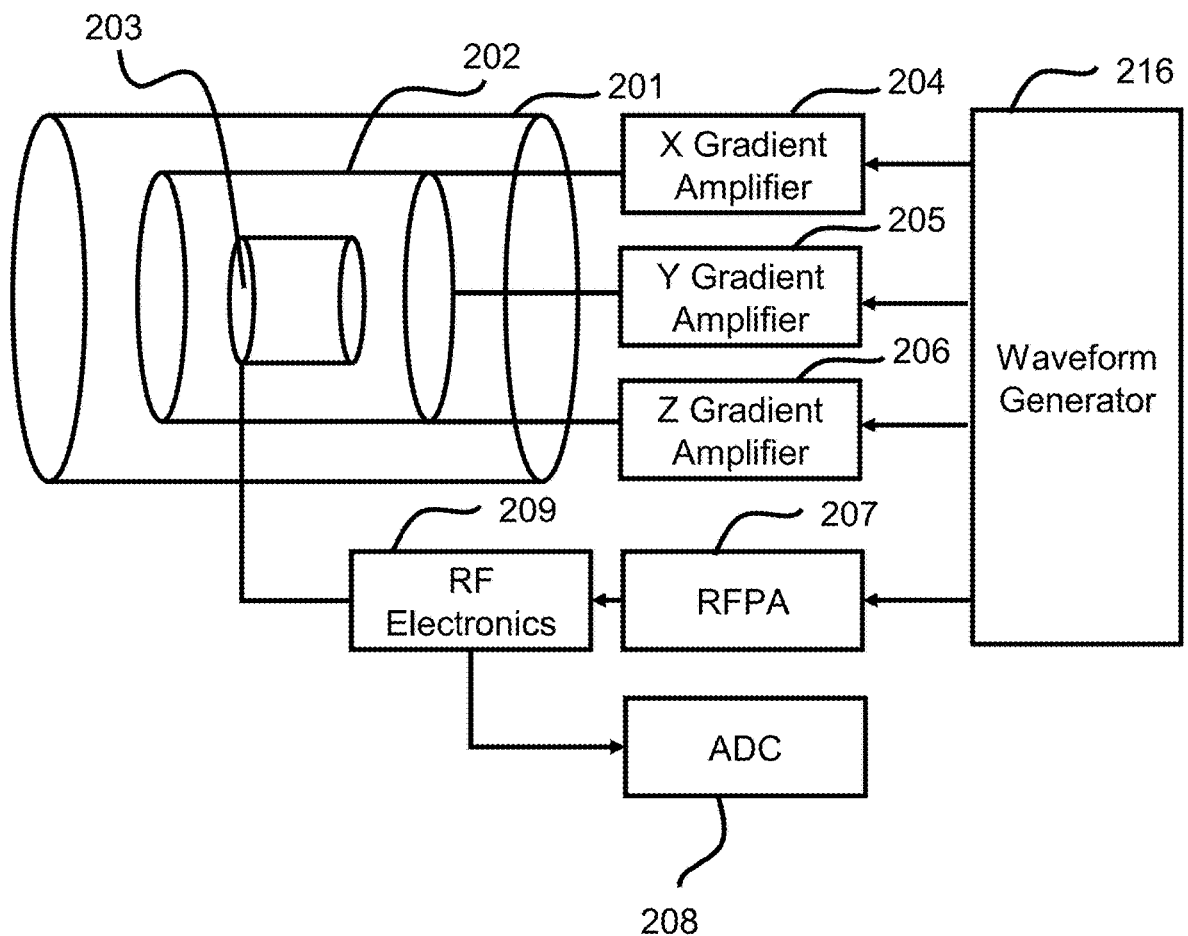
FIG. 2 is a schematic diagram illustrating an exemplary MRI scanner according to some embodiments of the present disclosure.

FIG. 2 is a schematic diagram illustrating an exemplary scanner according to some embodiments of the present disclosure. Taking an MRI scanner as an example, the scanner 110 may be designated as the MRI scanner. One or more components of the MRI scanner are illustrated in FIG. 2. As illustrated, main magnet 201 may generate a first magnetic field (or referred to as a main magnetic field) that may be applied to an object (also referred to as a subject) exposed inside the field. The main magnet 201 may include a resistive magnet or a superconductive magnet that both need a power supply (not shown) for operation. Alternatively, the main magnet 201 may include a permanent magnet. The main magnet 201 may include a bore that the object is placed within. The main magnet 201 may also control the homogeneity of the generated main magnetic field. Some shim coils may be in the main magnet 201. The shim coils placed in the gap of the main magnet 201 may compensate for the inhomogeneity of the magnetic field of the main magnet 201. The shim coils may be energized by a shim power supply.

Gradient coils 202 may be located inside the main magnet 201. The gradient coils 202 may generate a second magnetic field (or referred to as a gradient field, including gradient fields Gx, Gy, and Gz). The second magnetic field may be superimposed on the main field generated by the main magnet 201 and distort the main field so that the magnetic orientations of the protons of an object may vary as a function of their positions inside the gradient field, thereby encoding spatial information into MR signals generated by the region of the object being imaged. The gradient coils 202 may include X coils (e.g., configured to generate the gradient field Gx corresponding to the X direction), Y coils (e.g., configured to generate the gradient field Gy corresponding to the Y direction), and/or Z coils (e.g., configured to generate the gradient field Gz corresponding to the Z direction) (not shown in FIG. 2). In some embodiments, the Z coils may be designed based on circular (Maxwell) coils, while the X coils and the Y coils may be designed on the basis of the saddle (Golay) coil configuration. The three sets of coils may generate three different magnetic fields that are used for position encoding. The gradient coils 202 may allow spatial encoding of MR signals for image construction. The gradient coils 202 may be connected with one or more of an X gradient amplifier 204, a Y gradient amplifier 205, or a Z gradient amplifier 206. One or more of the three amplifiers may be connected to a waveform generator 216. The waveform generator 216 may generate gradient waveforms that are applied to the X gradient amplifier 204, the Y gradient amplifier 205, and/or the Z gradient amplifier 206. An amplifier may amplify a waveform. An amplified waveform may be applied to one of the coils in the gradient coils 202 to generate a magnetic field in the X-axis, the Y-axis, or the Z-axis, respectively. The gradient coils 202 may be designed for either a close-bore MRI scanner or an open-bore MRI scanner. In some instances, all three sets of coils of the gradient coils 202 may be energized and three gradient fields may be generated thereby. In some embodiments of the present disclosure, the X coils and Y coils may be energized to generate the gradient fields in the X direction and the Y direction. As used herein, the X-axis, the Y-axis, the Z-axis, the X direction, the Y direction, and the Z direction in the description of FIG. 2 are the same as or similar to those described in FIG. 1.

In some embodiments, radio frequency (RF) coils 203 may be located inside the main magnet 201 and serve as transmitters, receivers, or both. The RF coils 203 may be in connection with RF electronics 209 that may be configured or used as one or more integrated circuits (ICs) functioning as a waveform transmitter and/or a waveform receiver. The RF electronics 209 may be connected to a radiofrequency power amplifier (RFPA) 207 and an analog-to-digital converter (ADC) 208.

When used as transmitters, the RF coils 203 may generate RF signals that provide a third magnetic field that is utilized to generate MR signals related to the region of the object being imaged. The third magnetic field may be perpendicular to the main magnetic field. The waveform generator 216 may generate an RF pulse. The RF pulse may be amplified by the RFPA 207, processed by the RF electronics 209, and applied to the RF coils 203 to generate the RF signals in response to a powerful current generated by the RF electronics 209 based on the amplified RF pulse.

When used as receivers, the RF coils may be responsible for detecting MR signals (e.g., echoes). After excitation, the MR signals generated by the object may be sensed by the RF coils 203. The receive amplifier then may receive the sensed MR signals from the RF coils 203, amplify the sensed MR signals, and provide the amplified MR signals to the ADC 208. The ADC 208 may transform the MR signals from analog signals to digital signals. The digital MR signals then may be sent to the processing device 140 for sampling.

In some embodiments, the gradient coils 202 and the RF coils 203 may be circumferentially positioned with respect to the object. It is understood by those skilled in the art that the main magnet 201, the gradient coils 202, and the RF coils 203 may be situated in a variety of configurations around the object.

In some embodiments, the RFPA 207 may amplify an RF pulse (e.g., the power of the RF pulse, the voltage of the RF pulse) such that an amplified RF pulse is generated to drive the RF coils 203. The RFPA 207 may include a transistor-based RFPA, a vacuum tube-based RFPA, or the like, or any combination thereof. The transistor-based RFPA may include one or more transistors. The vacuum tube-based RFPA may include a triode, a tetrode, a klystron, or the like, or any combination thereof. In some embodiments, the RFPA 207 may include a linear RFPA, or a nonlinear RFPA. In some embodiments, the RFPA 207 may include one or more RFPAs.

In some embodiments, the MRI scanner 110 may further include an object positioning system (not shown). The object positioning system may include an object cradle and a transport device. The object may be placed on the object cradle and be positioned by the transport device within the bore of the main magnet 201.

MRI systems (e.g., the imaging system 100 disclosed in the present disclosure) may be commonly used to obtain an interior image from a patient for a particular region of interest that can be used for the purposes of, e.g., diagnosis, treatment, or the like, or a combination thereof. MRI systems include a main magnet (e.g., the main magnet 201) assembly for providing a strong uniform main magnetic field to align the individual magnetic moments of the H atoms within the patient's body. During this process, the H atoms oscillate around their magnetic poles at their characteristic Larmor frequency. If the tissue is subjected to an additional magnetic field, which is tuned to the Larmor frequency, the H atoms absorb additional energy, which rotates the net aligned moment of the H atoms. The additional magnetic field may be provided by an RF excitation signal (e.g., the RF signal generated by the RF coils 203). When the additional magnetic field is removed, the magnetic moments of the H atoms rotate back into alignment with the main magnetic field thereby emitting an MR signal. The MR signal is received and processed to form an MR image. T1 relaxation may be the process by which the net magnetization grows/returns to its initial maximum value parallel to the main magnetic field. T1 may be the time constant for regrowth of longitudinal magnetization (e.g., along the main magnetic field). T2 relaxation may be the process by which the transverse components of magnetization decay or dephase. T2 may be the time constant for decay/dephasing of transverse magnetization.

If the main magnetic field is uniform across the entire body of the patient, then the RF excitation signal may excite all of the H atoms in the sample non-selectively. Accordingly, in order to image a particular portion of the patient's body, magnetic field gradients Gx, Gy, and Gz (e.g., generated by the gradient coils 202) in the x, y, and z directions, having a particular timing, frequency, and phase, may be superimposed on the uniform magnetic field such that the RF excitation signal excites the H atoms in a desired slice of the patient's body, and unique phase and frequency information is encoded in the MR signal depending on the location of the H atoms in the "image slice."

Typically, portions of the patient's body to be imaged are scanned by a sequence of measurement cycles in which the RF excitation signals and the magnetic field gradients Gx, Gy and Gz vary according to an MRI imaging protocol that is being used. A protocol may be designed for one or more tissues to be imaged, diseases, and/or clinical scenarios. A protocol may include a certain number of pulse sequences oriented in different planes and/or with different parameters. The pulse sequences may include spin echo sequences, gradient echo sequences, diffusion sequences, inversion recovery sequences, or the like, or any combination thereof. For instance, the spin echo sequences may include fast spin echo (FSE), turbo spin echo (TSE), rapid acquisition with relaxation enhancement (RARE), half-Fourier acquisition single-shot turbo spin-echo (HASTE), turbo gradient spin echo (TGSE), or the like, or any combination thereof. The protocol may also include information regarding image contrast and/or ratio, an ROI, slice thickness, an imaging type (e.g., T1 weighted imaging, T2 weighted imaging, proton density weighted imaging, etc.), T1, T2, an echo type (spin echo, fast spin echo (FSE), fast recovery FSE, single shot FSE, gradient recalled echo, fast imaging with steadstate procession, and so on), a flip angle value, acquisition time (TA), echo time (TE), repetition time (TR), echo train length (ETL), the number of phases, the number of excitations (NEX), inversion time, bandwidth (e.g., RF receiver bandwidth, RF transmitter bandwidth, etc.), or the like, or any combination thereof.

For each MRI scan, the resulting MR signals may be digitized and processed to reconstruct an image in accordance with the MRI imaging protocol that is used.

FIG. 3 is a schematic diagram illustrating exemplary hardware and/or software components of a computing device on which a processing device may be implemented according to some embodiments of the present disclosure. As illustrated in FIG. 3, computing device 300 may include a processor 310, a storage 320, an input/output (I/O) 330, and a communication port 340.

The processor 310 may execute computer instructions (program code) and perform functions of the processing device 140 in accordance with techniques described herein. The computer instructions may include routines, programs, objects, components, signals, data structures, procedures, modules, and functions, which perform particular functions described herein. For example, the processor 310 may process data obtained from the scanner 110, the terminal 130, the storage device 150, and/or any other component of the MRI system 100. Specifically, the processor 310 may process one or more measured data sets (e.g., MR scan data) obtained from the scanner 110. For example, the processor 310 may reconstruct an MR image based on the data set(s). In some embodiments, the reconstructed image may be stored in the storage device 150, the storage 320, etc. The reconstructed image may be two-dimensional image or three-dimensional image. The reconstructed image may be a low-resolution image, or a high-resolution image. In some embodiments, the processor 310 may determine a high-resolution shape of a target (e.g., a heart or a lung) from the low-resolution image. In some embodiments, the processor 310 may further track a change of the shape of the target over time. In some embodiments, the processor 310 may include a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration purposes, only one processor is described in the computing device 300. However, it should be noted that the computing device 300 in the present disclosure may also include multiple processors, and thus operations of a method that are performed by one processor as described in the present disclosure may also be jointly or separately performed by the multiple processors. For example, if in the present disclosure the processor of the computing device 300 executes both operations A and B, it should be understood that operations A and step B may also be performed by two different processors jointly or separately in the computing device 300 (e.g., a first processor executes operation A and a second processor executes operation B, or the first and second processors jointly execute operations A and B).

The storage 320 may store data/information obtained from the MRI scanner 110, the terminal 130, the storage device 150, or any other component of the MRI system 100. In some embodiments, the storage 320 may include a mass storage device, a removable storage device, a volatile read-and-write memory, a read-only memory (ROM), or the like, or any combination thereof. For example, the mass storage device may include a magnetic disk, an optical disk, a solid-state drive, etc. The removable storage device may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the storage 320 may store one or more programs and/or instructions to perform exemplary methods described in the present disclosure. For example, the storage 320 may store a program for the processing device 140 for generating and tracking shapes of the target.

The I/O 330 may input or output signals, data, or information. In some embodiments, the I/O 330 may enable user interaction with the processing device 140. In some embodiments, the I/O 330 may include an input device and an output device. Exemplary input devices may include a keyboard, a mouse, a touch screen, a microphone, a trackball, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

Merely by way of example, a user (e.g., an operator) of the processing device 140 may input data related to an object (e.g., a patient) that is being/to be imaged/scanned through the I/O 330. The data related to the object may include identification information (e.g., the name, age, gender, medical history, contract information, physical examination result, etc.) and/or the test information including the nature of the MRI scan that must be performed. The user may also input parameters needed for the operation of the MRI scanner 110, such as image contrast and/or ratio, a region of interest (ROI), slice thickness, an imaging type (e.g., T1 weighted imaging, T2 weighted imaging, proton density weighted imaging, etc.), T1, T2, an echo type (spin echo, fast spin echo (FSE), fast recovery FSE, single shot FSE, gradient recalled echo, fast imaging with steady-state procession, and so on), a flip angle value, acquisition time (TA), echo time (TE), repetition time (TR), echo train length (ETL), the number of phases, the number of excitations (NEX), inversion time, bandwidth (e.g., RF receiver bandwidth, RF transmitter bandwidth, etc.), a scan type, a type of sampling, or the like, or any combination thereof. The I/O may also display MR images generated based on the sampled data.

The communication port 340 may be connected to a network (e.g., the network 120) to facilitate data communications. The communication port 340 may establish connections between the processing device 140 and the MRI scanner 110, the terminal 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include Bluetooth, Wi-Fi, WiMax, WLAN, ZigBee, mobile network (e.g., 3G, 4G, 5G, etc.), or the like, or a combination thereof. In some embodiments, the communication port 340 may be a standardized communication port, such as RS232, RS485, etc. In some embodiments, the communication port 340 may be a specially designed communication port. For example, the communication port 340 may be designed in accordance with the digital imaging and communications in medicine (DICOM) protocol.

Figure 4:
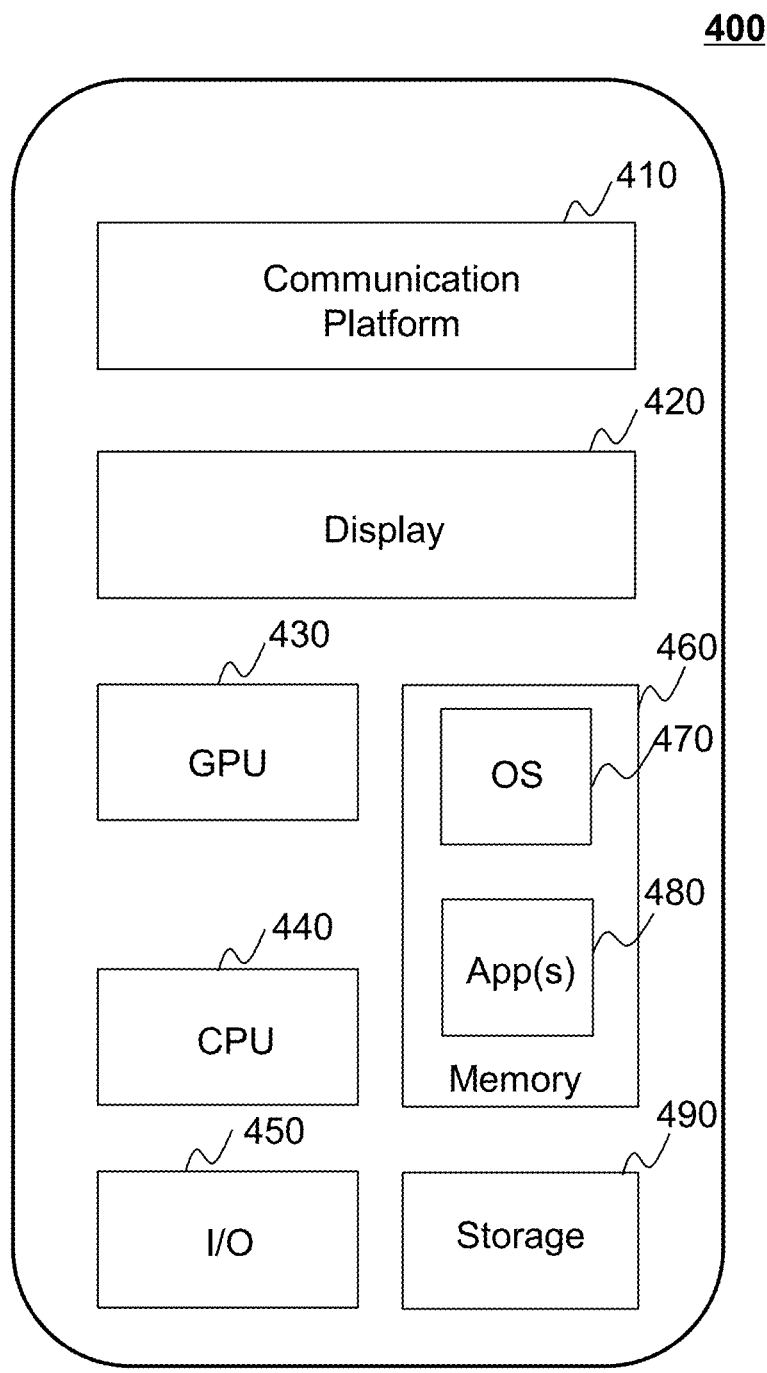
FIG. 4 is a schematic diagram illustrating exemplary hardware and/or software components of a mobile device according to some embodiments of the present disclosure.

FIG. 4 is a schematic diagram illustrating exemplary hardware and/or software components of a mobile device on which a terminal may be implemented according to some embodiments of the present disclosure. As illustrated in FIG. 4, mobile device 400 may include a communication platform 410, a display 420, a graphic processing unit (GPU) 430, a central processing unit (CPU) 440, an I/O 450, a memory 460, and a storage 490. In some embodiments, any other suitable component, including but not limited to a system bus or a controller (not shown), may also be included in the mobile device 400. In some embodiments, a mobile operating system 470 (e.g., iOS, Android, Windows Phone, etc.) and one or more applications 480 may be loaded into the memory 460 from the storage 490 in order to be executed by the CPU 440. The applications 480 may include a browser or any other suitable mobile apps for receiving and rendering information relating to image processing or other information from the processing device 140. User interactions with the information stream may be achieved via the I/O 450 and provided to the processing device 140 and/or other components of the MRI system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate and track shapes of a target as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 5:
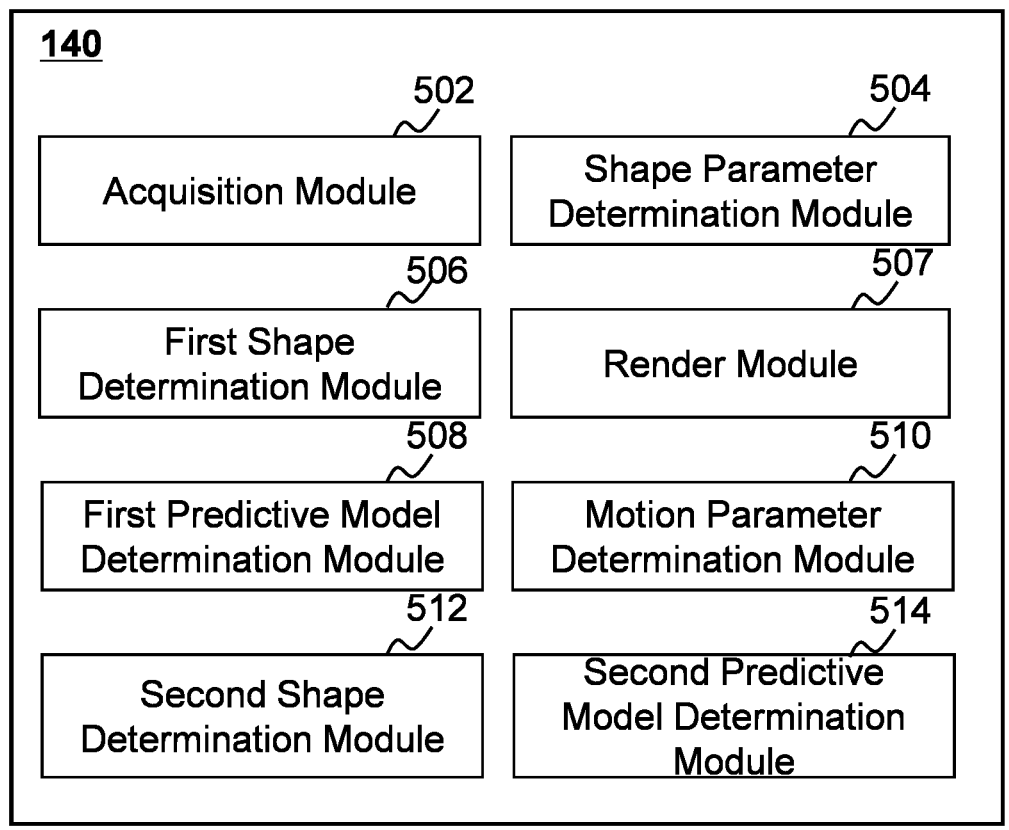
FIG. 5 is a block diagram illustrating an exemplary processing device according to some embodiments of the present disclosure.

FIG. 5 is a block diagram illustrating an exemplary processing device according to some embodiments of the present disclosure. In some embodiments, the processing device 140 may be implemented on a computing device 300 (e.g., the processor 310) illustrated in FIG. 2 or a CPU 440 illustrated in FIG. 4. As illustrated in FIG. 5, the processing device 140 may include an acquisition module 502, a shape parameter determination module 504, a first shape determination module 506, a render module 507, a first predictive model determination module 508, a motion parameter determination module 510, a second shape determination module 512, and a second predictive model determination module 514. Each of the modules described above may be a hardware circuit that is designed to perform certain actions, e.g., according to a set of instructions stored in one or more storage media, and/or any combination of the hardware circuit and the one or more storage media.

The acquisition module 502 may be configured to obtain one or more images (e.g., LR images or HR images) including a target (e.g., the heart, a liver, or a lung) to be segmented. In some embodiments, the acquisition module 502 may obtain at least one first resolution image. The first resolution image may be an LR image or a HR image. The first resolution image may correspond to one of a sequence of time frames of a medical scan (e.g., an MRI scan). The first resolution image may refer to an image frame of a sequence of image frames acquired by a scanner (e.g., the scanner 110). The acquisition module 502 may obtain the at least one first resolution image from the scanner 110, the processing device 140, one or more storage devices disclosed in the present disclosure (e.g., the storage device 150), etc. Given that the first resolution image is designated as an LR image. In some embodiments, the LR image may be a 3D LR volume. In some embodiments, the acquisition module 502 may be configured to obtain training data for training a machine learning model. For example, the acquisition module 502 may obtain multiple groups of training data for training a shape parameter predictive model (SPPM). As another example, the acquisition module 502 may obtain a plurality of image pairs to form training data for training a motion parameter predictive model (MPPM).

The shape parameter determination module 504 may be configured to determine, according to a predictive model, one or more shape parameters regarding a shape of a target from the at least one first resolution image (e.g., the 3D LR volume). In some embodiments, the shape parameters may include at least one shape variance coefficient and at least one pose transformation parameter (e.g., an affine transformation matrix). The predictive model may be a target SPPM. The target SPPM may be generated by the first predictive model determination module 508. The shape parameter determination module 504 may input an LR image to the target SPPM, and output the shape variance coefficient and the pose transformation parameter using the target SPPM. More descriptions regarding the determination of the shape variance coefficient and the pose transformation parameter may be found elsewhere in the present disclosure (e.g., FIG. 7, FIG. 8A and/or FIG. 9A, and the descriptions thereof).

The first shape determination module 506 may be configured to determine, based on the one or more shape parameters and a shape model, at least one shape of the target from the at least one LR image (e.g., the 3D LR volume). In some embodiments, the shape model may be a statistical shape model. The shape model may be described via the one or more shape parameters regarding the shape of the target, a mean shape, and a first eigen vector matrix. The first eigen vector matrix may be computed based on a shape covariance matrix. The first eigen vector may be also referred to as a shape covariance matrix derived eigen vector matrix. As used herein, the shape model may be described in connection with Equation (1) illustrated in FIG. 7. For example, the first shape determination module 506 may obtain the affine transformation matrix, the shape variance, the mean shape, and the shape covariance matrix derived eigen vector matrix. The first shape determination module 506 may introduce them to the Equation (1) to generate a shape vector of the target. The shape vector may include coordinates of a plurality of landmarks labelled on the target. More descriptions regarding the determination of the shape of the target may be found elsewhere in the present disclosure (e.g., FIG. 7, and the descriptions thereof).

The render module 507 may be configured to generate a second resolution visual representation of the target by rendering the determined shape of the target. In some embodiments, the second resolution may be equal to the first resolution. In some embodiments, the second resolution may be different from the first resolution. For example, the second resolution may be higher than the first resolution. The second resolution visual representation may be deemed as a high-resolution visual representation (also referred to as HR segmentation). In some embodiments, the render module 507 may generate a mesh surface by connecting the plurality of landmarks based on the coordinates of the landmarks in the determined shape vector. The mesh surface may include a plurality of surface grids. A feature point (e.g., the vertex, the base) of each grid may correspond to the coordinates of a corresponding landmark. The render module 507 may render the plurality of surface grids to generate the high-resolution visual representation of the target (e.g., a high-resolution 3D model of the target). In some embodiments, the render module 507 may render a portion of the mesh surface of the target with a specific texture (e.g., a specific color, or a specific shadow). In some embodiments, a visualization of the target may be generated by rendering the shape of the target with various textures. For example, the left ventricle (LV) of the heart may be rendered with a red color, and the right ventricle (RV) of the heart may be rendered with a green color.

The first predictive model determination module 508 may be configured to generate the target SPPM. In some embodiments, the first predictive model determination module 508 may obtain multiple groups of training data through the acquisition module 502. The multiple groups of training data may be associated with a plurality of samples. Each of the plurality of samples may include a first resolution image including the target (e.g., the heart) of a sample subject (e.g., a patient with a heart disease). In some embodiments, the first resolution image may be an LR image or HR image. In some embodiments, the first resolution image may be 2D image or 3D image (also referred as 3D volume or volumetric image). As used herein, a plurality of LR 3D volumes may be selected as training samples. The multiple groups of training data associated with the training samples may form a training set. In some embodiments, the first predictive model determination module 508 may obtain an initial SPPM through the acquisition module 502. The initial SPPM may be a machine learning regression model. Exemplary machine learning regression models may include a decision tree model, a deep learning neural network model, a regression tree model, a random forest model, or the like, or a combination thereof. Exemplary deep learning neural network models may include a convolutional neural network model (CNN), multi-layer perceptron neural network (MLP), a fully convolutional neural network (FCN) model, a generative adversarial network (GAN), a back propagation (BP) machine learning model, a radial basis function (RBF) machine learning model, a deep belief nets (DBN), an Elman machine learning model, or the like, or a combination thereof. As used herein, the initial SPPM may be the CNN model (e.g., CNN model 1100 illustrated in FIG. 11). The first predictive model determination module 508 may input the multiple groups of training data to the initial SPPM for training the initial SPPM. The first predictive model determination module 508 may perform one or more iterations to train the initial SPPM. The one or more iterations may be performed to update the plurality of learning parameters of the initial SPPM until a termination condition is satisfied. For example, the termination condition may be satisfied when the loss function of the initial model that includes the updated parameters falls below a first threshold. As another example, the termination condition may be satisfied when an iteration count of the iterative process exceeds a second threshold. As a further example, the termination condition may be satisfied when the loss function of the initial model that includes the updated parameters converges. The convergence may be deemed to have occurred if the variation of the values of the loss function in two or more consecutive iterations is smaller than a value (or approximating to a constant value). The first predictive model determination module 508 may designate the trained SPPM as the target SPPM. In some embodiments, the first predictive model determination module 508 may perform the training process in offline. The target SPPM may be stored in a storage device (e.g., the storage device 150). More descriptions regarding the determination of the SPPM may be found elsewhere in the present disclosure (e.g., FIGS. 10-11, and the descriptions thereof).

In some embodiments, the processing device 140 may track a change of a shape of the target over time. Merely for illustration, the acquisition module 502 may obtain first resolution images corresponding to a time frame N (e.g., the second image frame $t_2$ shown in FIG. 6) and a preceding time frame N−1 (e.g., the first image frame $T_1$ shown in FIG. 6), where N is an integer that is equal to or greater than 2. The first shape determination module 506 may determine a shape of a target from the first resolution image corresponding to the preceding time frame N−1. The second shape determination module 512 may determine, based on the shape of the target corresponding to the previous frame N−1 and a motion model of the target, a shape of the target corresponding to the frame N. In some embodiments, the motion model may be described via motion parameters, a mean motion, and a second eigen vector matrix. The second eigen vector matrix may be computed based on a motion covariance matrix. The second eigen vector may be also referred to as a motion covariance matrix derived eigen vector matrix. The motion model may be used to determine a motion field regarding two consecutive image frames (e.g., a first image frame at N−1, and a second image frame at N). As used herein, the motion model may be expressed as Equation (8) illustrated in FIG. 12. The motion parameter determination module 510 may determine the motion parameters using the target MMPM. The target MMPM may be generated by the second predictive model determination module 514. In some embodiments, the processing device 140 may determine the mean motion and the motion covariance matrix based on a plurality of sample cine image frames from a plurality of image sequences. The second eigen vector matrix may be derived from the motion covariance matrix. The second shape determination module 512 may obtain the motion parameters, the mean motion, and the motion covariance matrix derived eigen vector matrix. The second shape determination module 512 may introduce them to the Equation (8) to determine the motion field. The second shape determination module 512 may determine the shape of the target of the second image frame by applying the determined motion field to the shape of the first image frame. More descriptions regarding the determination of the motion field may be found elsewhere in the present disclosure (e.g., FIG. 12, and the descriptions thereof).

The second predictive model determination module 514 may be configured to generate the target SPPM. The second predictive model determination module 514 may obtain a plurality of image pairs to form training data through the acquisition module 502. Each of the plurality of image pairs may include two consecutive image frames. For example, a first image frame corresponding to a first time frame M−1 and a second image frame corresponding to a second time frame M, where M is an integer that is less than or equal to 2. The plurality of image pairs may be associated with a plurality of samples. Each of the plurality of samples may include an image sequence (e.g., a cine MR image sequence) composed of a plurality of image frames. The image sequence may be from a sample subject. A sample subject may be the subject under an examination as describe in, e.g., FIG. 7 of the present disclosure, or a patient with a heart disease. The second predictive model determination module 514 may obtain an initial MPPM through the acquisition module 502. The initial MPPM may be a machine learning regression model similar to the initial SPPM. As used herein, the initial MPPM may be the CNN model. The second predictive model determination module 514 may input the training data to the initial motion predictive model for training the initial MPPM. In some embodiments, the second predictive model determination module 514 may perform one or more iterations to train the initial MPPM. The one or more iterations may be performed to update a plurality of learning parameters of the initial MPPM until a termination condition is satisfied. For example, the termination condition may be satisfied when the loss function of the initial MPPM that includes the updated parameters falls below a third threshold. As another example, the termination condition may be satisfied when an iteration count of the iterative process exceeds a fourth threshold. As a further example, the termination condition may be satisfied when the loss function of the initial MPPM that includes the updated parameters converges. The convergence may be deemed to have occurred if the variation of the values of the loss function in two or more consecutive iterations is smaller than a value (or approximating to a constant value). The second predictive model determination module 514 may designate the trained MPPM as the target MPPM. In some embodiments, the second predictive model determination module 514 may perform the training process in offline. The target MPPM may be stored in a storage device (e.g., the storage device 150). More descriptions regarding the determination of the MPPM may be found elsewhere in the present disclosure (e.g., FIGS. 12-14, and the descriptions thereof).

In some embodiments, one or more modules illustrated in FIG. 5 may be implemented in at least part of the exemplary MRI system 100 as illustrated in FIG. 1. For example, the acquisition module 502, the shape parameter determination module 504, the first shape determination module 506, the render module 507, the first predictive model determination module 508, the motion parameter determination module 510, the second shape determination module 512, and/or the second predictive model determination module 514 may be integrated into a console (not shown). Via the console, a user may set parameters for scanning a subject, controlling imaging processes, controlling parameters for the reconstruction of an image, viewing reconstructed images, etc. In some embodiments, the console may be implemented via the processing device 140 and/or the terminal(s) 130. In some embodiments, the first predictive model determination module 508 or the second predictive model determination module 514 may be integrated into the terminal(s) 130.

In some embodiments, the processing device 140 does not include the first predictive model determination module 508 and/or the second predictive model determination module 514. One or more target machine learning models (e.g., SPPM and MPPM) determined by another device may be stored in the MRI system 100 (e.g., the storage device 150, the storage 320, the storage 490, or in an external device accessible by the processing device 140 via, for example, the network 120. In some embodiments, such a device may include a portion the same as or similar to the first predictive model determination module 508 and/or the second predictive model determination module 514.

Figure 7:
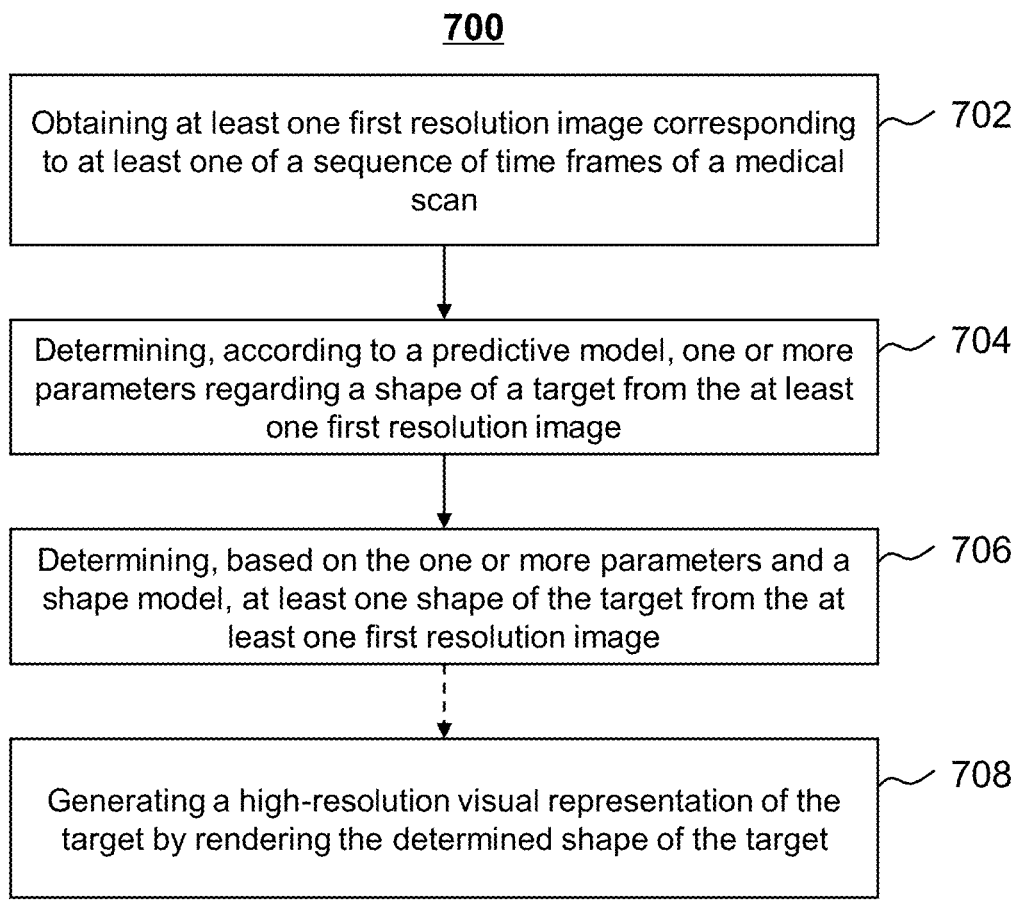
FIG. 7 is a flowchart illustrating an exemplary process for generating a segmentation of a target according to some embodiments of the present disclosure.

FIG. 7 is a flowchart illustrating an exemplary process for generating a segmentation (e.g., a high-resolution segmentation) of a target according to some embodiments of the present disclosure. In some embodiments, process 700 may be implemented in the imaging system 100 illustrated in FIG. 1. For example, the process 700 may be stored in a storage device (e.g., the storage device 150, or the storage 320 of the processing device 140) as a form of instructions, and can be invoked and/or executed by the processing device 140 (e.g., the processor 310 of the processing device 140, or one or more modules in the processing device 140 illustrated in FIG. 5). The operations of the illustrated process 700 presented below are intended to be illustrative. In some embodiments, the process 700 may be accomplished with one or more additional operations not described, and/or without one or more of the operations discussed. Additionally, the order in which the operations of the process 700 as illustrated in FIG. 7 and described below is not intended to be limiting.

In 702, the processing device (e.g., the acquisition module 502 of the processing device 140) may obtain at least one a first resolution image. A first resolution image may correspond to one of a sequence of time frames of a medical scan (e.g., an MRI scan). The first resolution image may refer to an image frame of a sequence of image frames acquired by a scanner (e.g., an MRI scanner). In some embodiments, the at least one first resolution image may be obtained from the scanner 110, the processing device 140, one or more storage devices disclosed in the present disclosure (e.g., the storage device 150), etc. In some embodiments, the first resolution image may be designated as a low-resolution (LR) image. In some embodiments, the first resolution image may be designated as a high-resolution image.

Taking an MR image as an example, the first resolution image may be designated as the MR image having the first resolution. In some embodiments, the scanner 110 may be configured to generate an MR image by scanning a subject or at least part of the subject. The MR image may be a two-dimensional (2D) image or a three-dimensional (3D) image. In the 2D image, its tiniest discrete element may be termed as a pixel. In the 3D image, its tiniest discrete element may be termed as a voxel ("a volumetric pixel" or "a volume pixel"). In some embodiments, the 3D image may be a 3D stack or 3D volume composed of multiple 2D slices. For example, in 2D multi-slice imaging, a region of interest (ROI) of the subject may be divided into a plurality of slices. A 2D slice image of each of the multiple slices may be generated. Multiple slice images may be constructed to constitute a 3D volume.

Figure 6:
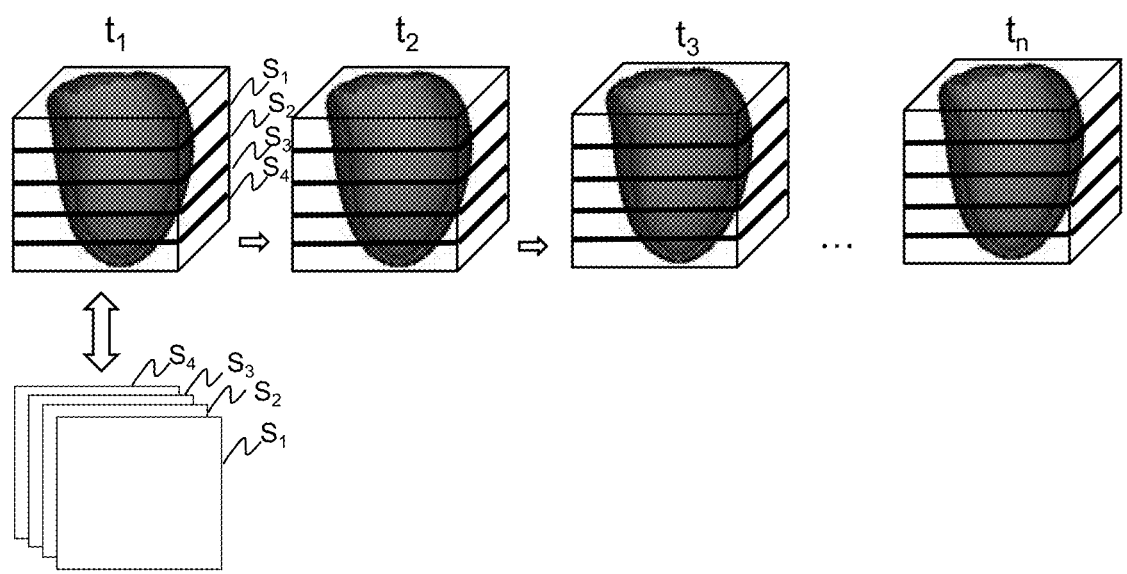
FIG. 6 is a schematic diagram illustrating an exemplary cine cardiac magnetic resonance (CMR) imaging according to some embodiments of the present disclosure

A cine MRI technology may be used to generate an image sequence of a plurality of image frames, each of which corresponds to a time frame of a sequence of time frames (hereinafter referred as a time frame sequence). Merely by way of example, FIG. 6 illustrates an exemplary cine cardiac magnetic resonance (CMR) imaging according to some embodiments of the present disclosure. As illustrated in FIG. 6, the cine CMR imaging may provide 4D CMR data (3D+t, that is, 3D CMR volumes and time frames corresponding to the 3D volumes), such as a first 3D CMR volume at a first time frame $t_1$, a second 3D CMR volume at a second time frame $t_2$, a third 3D CMR volume at a third time frame $t_3$, . . . , a $n^{th}$ 3D CMR volume at a $n^{th}$ time frame $t_n$. See, e.g., FIG. 6. In cine CMR, a time frame may correspond to a cardiac phase in a cardiac cycle. A 3D CMR volume may be an image frame of the image sequence. In some embodiments, the CMR volumes during different time frames may be different. A shape of the target represented in the CMR volumes may be different. In clinical applications, a 3D CMR volume may be formed by multiple slice images using 2D imaging technology. For example, the first 3D CMR volume may be constructed by four slice images, $S_1$-$S_4$. See, e.g., FIG. 6. In a similar way, other CMR volumes (e.g., the second 3D CMR volume, . . . , the $n^{th}$ 3D CMR volume) may be constructed by multiple slice images.

In some embodiments, the 3D volume and/or the slice image may be an HR image and/or an LR image. For example, the first CMR volume illustrated in FIG. 6 may be a 3D HR image or a 3D LR image. The slice image ($S_1$, $S_2$, $S_3$, or $S_4$ as illustrated in FIG. 6) may be a 2D HR image or a 2D LR image. In some embodiments, if the slice images are HR images, the 3D volume constructed by the HR slice images may be designated as an HR image accordingly. If the slice images are LR images, the 3D volume constructed by the LR slice images may be designated as an LR image accordingly. In 2D multi-slice imaging, a slice resolution may be associated with a thickness of a scanned slice. If the slice thickness is big (e.g., 10 mm, 9 mm, 8 mm, etc.), an LR slice image may be generated. If the slice thickness is small (e.g., 3 mm, 2 mm, 1 mm, etc.), an HR slice image may be generated. In some embodiments, the slice thickness may be predetermined, which depends on one or more factors including, an objective of the scan, a clinical consideration, a user instruction regarding the slice thickness or other scan parameter(s). For example, the scanner 110 may generate a plurality of LR slice images by setting a relatively big slice thickness, which may shorten the scan time. As another example, the scanner 110 may generate a plurality of HR slice images by setting a relatively small slice thickness, which may obtain refined scan images though its scan time is longer than the low slice resolution MR. However, in clinical applications, low slice resolution MR may be well accepted.

Merely for illustration, the scanner 110 may be configured to generate a plurality of LR slice images using 2D multi-slice imaging. At least one portion of the plurality of LR slice images may be used to construct an image frame of an image sequence. The image sequence may include a plurality of LR volumes. The image frame may be an LR volume. In some embodiments, the plurality of LR slice images and the constructed LR volumes may be stored in a storage device (e.g., the storage device 150). The acquisition module 502 may obtain at least one image frame (e.g., the LR volume) from the storage device 150.

In some embodiments, the LR volume may include one or more targets in the ROI of the subject. The target may be a specific portion, organ, and/or tissue of the subject (e.g., a patient). For example, the target may include head, brain, neck, lung, shoulder, arm, thorax, heart, stomach, blood vessel, soft tissue, knee, feet, or the like, or any combination thereof. As shown in FIG. 6, the target may be the heart of the subject. The CMR volumes may present several shapes of the heart at different time frames. As another example, the target may be a specific portion of the heart, such as a left ventricle (LV) epicardium, a left ventricle (LV) endocardium, a right ventricle (RV) epicardium, a right ventricle (RV) endocardium, left atrium, mitral valve, or right atrium or combinations. The shape of target may facilitate a quantitative analysis in the diagnosis of some diseases (e.g., cardiovascular diseases). For example, if the cardiac shape (or the cardiac morphology) is segmented accurately, which may facilitate accurate assessment of cardiovascular physiology, such as the LV volume, the LV mass, and an ejection fraction. An accurate segmentation of the target is beneficial for the diagnosis.

In 704, the processing device (e.g., the shape parameter determination module 504 of the processing device 140) may determine, according to a predictive model, one or more shape parameters regarding a shape of a target from the at least one LR image (e.g., the 3D LR volume). In some embodiments, the shape parameters may include at least one shape variance coefficient and at least one pose transformation parameter. As used herein, the predictive model may be referred to as the shape parameter predictive model (SPPM).

In some embodiments, one or more shape parameters regarding the shape of the target may be determined according to a target SPPM. For example, the target SPPM may take a 3D LR volume as an input and generate the one or more shape parameters by processing the 3D LR volume. In some embodiments, the target SPPM may be constructed based on a machine learning regression model. Exemplary machine learning regression models may include a decision tree model, a deep learning neural network model, a regression tree model, a random forest model, gradient boosting tree, or the like, or a combination thereof. Exemplary deep learning neural network models may include a convolutional neural network model (CNN), multi-layer perceptron neural network (MLP), a fully convolutional neural network (FCN) model, a generative adversarial network (GAN), a back propagation (BP) machine learning model, a radial basis function (RBF) machine learning model, a deep belief nets (DBN), an Elman machine learning model, or the like, or a combination thereof. Merely for illustration, the SPPM may be constructed based on a CNN model (e.g., CNN model 1100 shown in FIG. 11). It should be noted that the SPPM can be constructed based on one or more of various machine learning regression models, and these variations do not depart from the scope of the present disclosure.

In some embodiments, the target SPPM may be obtained from the first predictive model determination module 508, the storage device 150, or any other storage device. For example, the first predictive model determination module 508 may generate the target SPPM by training an initial model (also referred to herein as an initial SPPM) based on a plurality of pairs of data using a machine learning algorithm. Exemplary machine learning algorithms may include a gradient descent algorithm, a Newton's algorithm, a Quasi-Newton algorithm, a Levenberg-Marquardt algorithm, a conjugate gradient algorithm, or the like, or a combination thereof. Each of the plurality of pairs of data may include a first resolution sample image (e.g., LR data of the LR sample image) and a second resolution mesh surface corresponding to the first resolution sample image. For example, the first resolution sample may be designated as an LR sample image, and the second resolution mesh surface may be designated as an HR mesh surface. The plurality of pairs of data may be used to train the initial model. During the training, the first predictive model determination module 508 may iteratively update parameters of the initial model to minimize a loss function of the initial model that includes the updated parameters. The first predictive model determination module 508 may terminate the iterative training process when a termination condition is satisfied. An exemplary termination condition may be that the loss function of the initial model that includes the updated parameters falls below a first threshold. Another exemplary termination condition may be that an iteration count of the iterative process reaches or exceeds a second threshold. A further exemplary termination condition may be that the loss function of the initial model that includes the updated parameters converges. When the termination condition is satisfied, the first predictive model determination module 508 may terminate the training process, and designate the trained initial model as the target SPPM. The target SPPM may be used to predict the one or more shape parameters regarding the target in an input first resolution image (e.g., an input LR image). The one or more shape parameters includes at least one shape variance coefficient (e.g., B illustrated in FIG. 8C, FIG. 9B, and FIG. 9C) and at least one pose transformation parameter (e.g., T illustrated in FIG. 8C, FIG. 9B, and FIG. 9C). More descriptions about the generation of the target SPPM may be found elsewhere in the present disclosure (e.g., FIG. 10 and the descriptions thereof).

In some embodiments, the SPPM may be constructed based on a single machine learning model. The SPPM may be configured to provide the shape variance and the pose transformation parameters simultaneously. For example, the shape parameter determination module 504 may determine the shape variance and the pose transformation parameters simultaneously using the single SPPM (e.g., the network model 840 illustrated in FIG. 8C).

In some embodiments, the SPPM may be constructed based on at least two sub-models, e.g., a first predictive sub-model and a second predictive sub-model. The first predictive sub-model may be configured to provide the pose transformation parameters, and the second predictive sub-model may be configured to provide the shape variance. In some embodiments, the first predictive sub-model and the second predictive sub-model may correlate with each other. For instance, the first predictive sub-model and the second predictive sub-model may each form a network layer. The first predictive sub-model and the second predictive sub-model may constitute an end-to-end network (e.g., network 1 and network 2 illustrated in FIGS. 9B and 9C). The first predictive sub-model and the second predictive sub-model may be trained simultaneously as the end-to-end network to determine the target SPPM.

In 706, the processing device (e.g., the first shape determination module 506 of the processing device 140) may determine, based on the one or more shape parameters and a shape model, at least one shape of the target from the at least one first resolution image (e.g., the 3D LR volume). In some embodiments, the shape model may be a statistical shape model. The shape model may be described via the one or more shape parameters regarding the shape of the target, a mean shape, and a shape covariance matrix derived eigen vector matrix. Merely by way of example, the first shape determination module 506 may obtain multiple variables of the shape model, such as the one or more shape parameters, the mean shape, and the first eigen vector matrix (i.e., shape covariance matrix derived eigen vector matrix). The first shape determination module 506 may input these known variables to the shape model, and determine the shape of the target. Specifically, the first shape determination module 506 may determine a shape vector of the target based on the shape model. As used herein, as in the field of computer vision, the shape of an object refers to a corresponding shape vector in an image space. The shape vector may include coordinates of a plurality of landmarks labelled on a surface (e.g., a contour) of the target in the volume.

In some embodiments, the shape model may be described according to Equation (1) as follows:

$$f_{shape}=T\times(f_{meanshape}+B\times P), \qquad (1)$$

where $f_{shape}$ denotes the shape vector of the target, T denotes an affine transformation that transforms the mean shape from the mean shape space to the image space, $f_{meanshape}$ denotes the mean shape of the target obtained from a plurality of samples, B is the shape variance coefficient, and P is the first eigen vector matrix (i.e., the shape covariance matrix derived eigen vector matrix). In some embodiments, by adjusting B, the processing device may delineate deformed shapes using shape variances with respect to the mean shape. In some embodiments, the affine transformation may be used to describe a pose change of the target from a first image space to a second image space. For example, the affine transformation may include translation transformation, rotation transformation, scale transformation, or the like, or any combination thereof. An affine transformation matrix may include at least one of translation coefficients, rotation coefficients, scaling coefficients. As used herein, the affine transformation matrix may be designated as the pose transformation parameter. In some embodiments, the affine transformation matrix and the shape variance of the target may be determined by the target SPPM based on an input of a first resolution volume (e.g., an LR volume). In some embodiments, the mean shape and the shape covariance matrix derived eigen vector matrix may be prior knowledge for the shape model. If the affine transformation matrix and the shape variance are determined, the segmentation of the shape of the target may be determined based on Equation (1).

In some embodiments, the mean shape may be determined based on a plurality of samples. Each of the plurality of samples may be an HR or LR volume (e.g., 3D CMR volume) including the target (e.g., the heart). In some embodiments, a plurality of HR volumes may be selected as the samples for determining the mean shape of the target. For each sample, a surface segmentation for the target may be performed in advance, and the shape of the target may be obtained. It should be understood that there are several shapes for the target in the plurality of samples. The samples may be data from sample subjects (e.g., sample patients). In some embodiments, for each segmentation, there are a same number (or count) of landmarks (or points) labelled on the surface of the target. The coordinates of the landmarks in their own image space may be recorded. In some embodiments, the number (or count) of the landmarks on the surface of the target may be set according to different scenarios. The number (or count) of the landmarks may correspond to a type of the target. In some embodiments, the plurality of segmented target shapes may be aligned with a common image space (e.g., a reference image space). The mean shape may be determined based on a mean or average of the plurality of aligned shapes. The shape alignment procedure may aim at filtering out translation, scaling, and/or rotational effects among the plurality of shapes. In some embodiments, the shape alignment procedure may be achieved via Procrustes analysis.

Merely by way of example, in the image space, a shape of the target in a sample may be represented by a shape vector. Let the shape vector be $a_i$, the shape vector includes coordinates of a plurality of landmarks. Assume that the shape is a 3D shape.

$$a_i = [(x_1^i, y_1^i, z_1^i), (x_2^i, y_2^i, z_2^i), \ldots, (x_k^i, y_k^i, z_k^i)], i = 1, 2, \ldots, n, \quad (2)$$

where $(x_j^i, y_j^i, z_j^i)$ denotes the coordinates of the $j^{th}$ landmark of the $i^{th}$ sample, n denotes the number (or count) of the samples. n shape vectors may be constructed for the n samples. In some embodiments, the mean shape may be determined based on the n shape vectors. For example, the n shape vectors may be aligned with the common image space. Then the mean or average of the aligned shape vectors may be designated as the mean shape. The shape covariance matrix, C, may be determined as well based on the mean shape and the plurality of training samples using, e.g., a principal component analysis (PCA) algorithm. In some embodiments, eigen values and eigen vectors may be derived from the shape covariance matrix via the PCA algorithm. Specifically, the eigen values associated with the shape covariance matrix may be computed via the PCA algorithm. The eigen vectors may correspond to the eigen values. The computed eigen values may be sorted from largest to smallest. Then the eigen vectors corresponding to the predetermined number (or counts) of eigen vectors (e.g., the top d eigen values) may be selected. The selected eigen vectors (e.g., the top d eigen vectors corresponding to the top d eigen values) may form the first eigen vector matrix, P.

Merely by way of example, the processing device 140 may perform an iterative process to determine the mean shape. For instance, the plurality of shape vectors of the target may be aligned with a first reference space (e.g., an image space corresponding to sample A). The processing device 140 may determine a first mean shape for the aligned samples. Then the plurality of shape vectors of the target may be aligned to the first mean shape space. By that analogy, the processing device 140 may repeat the alignment operation until the generated mean shape satisfies a condition (e.g., the generated mean shape deemed convergent). In some embodiments, the generated mean shape is considered convergent if the mean shape approaches a constant value. For instance, the generated mean shape is considered convergent or approaches a constant value if the variation of the mean shape between consecutive iterations falls below a threshold. The processing device 140 may designate a final mean shape that satisfies the condition as the mean shape of the shape model. In some embodiments, for each iteration, mean shape a may be determined according to Equation (3) as follows:

$$\bar{a} = \frac{1}{n} \sum_{i=1}^{n} a_i. \quad (3)$$

In some embodiments, the shape covariance matrix, C, may be determined based on the mean shape. For example, the shape covariance matrix may be determined according to Equation (4) as follows:

$$C = \frac{1}{n} \sum_{i=1}^{n} (a_i - \bar{a})^T \cdot (a_i - \bar{a}). \quad (4)$$

Then eigen values and eigen vectors associated with the shape covariance matrix may be computed via the PCA algorithm. The eigen vectors may correspond to the eigen values. The computed eigen values may be sorted from largest to smallest. Then the eigen vectors corresponding to the predetermined number (or counts) of eigen vectors (e.g., the top d eigen values) may be selected. The selected eigen vectors (e.g., the top d eigen vectors corresponding to the top d eigen values) may form the first eigen vector matrix, P.

According to Equation (1), when these variables of the shape model, including the affine transformation matrix, the shape variance, the mean shape, and the shape covariance matrix derived eigen vector matrix, are known, the first shape determination module 506 may determine the shape vector of the target using the shape model. The first shape determination module 506 may generate the segmentation of the target based on the determined shape vector. In some embodiments, for each of the image sequence including the plurality of image frames, the first shape determination module 506 may determine the shape of the target from the corresponding image frame based on the shape model.

In some embodiments, the determination of the mean shape and/or the shape covariance matrix derived eigen vector matrix may be an offline process. For example, the processing device 140 may determine the mean shape and the shape covariance matrix derived eigen vector matrix in advance. The determined mean shape and the shape covariance derived eigen vector matrix may be stored in the storage device 150. When performing operation 706, the first shape determination module 506 may invoke the mean shape and the shape covariance derived eigen vector matrix from the storage device 150, and introduce them to the Equation (1). The shape vector of the target may be determined by further introducing the affine transformation matrix and the shape variance to the Equation (1).

In 708, the processing device (e.g., the render module 507 of the processing device 140) may generate a second resolution visual representation of the target by rendering the determined shape of the target. In some embodiments, the second resolution may be the same as the first resolution. In some embodiments, the second resolution may be different from the first resolution. For example, the first resolution is lower than the second resolution. The second resolution visual representation may be deemed as a high-resolution (HR) visual representation.

For example, the render module 507 may generate a mesh surface by connecting the plurality of landmarks based on the coordinates of the landmarks in the determined shape vector. The mesh surface may include a plurality of surface grids. A feature point (e.g., the vertex, the base) of each grid may correspond to the coordinates of a corresponding landmark. The render module 507 may render the plurality of surface grids to generate the second resolution visual representation of the target (e.g., a high-resolution 3D model of the target). In some embodiments, the render module 507 may render a portion of the mesh surface of the target with a specific texture (e.g., a specific color, or a specific shadow). In some embodiments, a visualization of the target may be generated by rendering the shape of the target with various textures. For example, the LV of the heart may be rendered with a red color, and the RV of the heart may be rendered with a green color.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 704 and 706 may be integrated into a single operation.

Figure 8A:
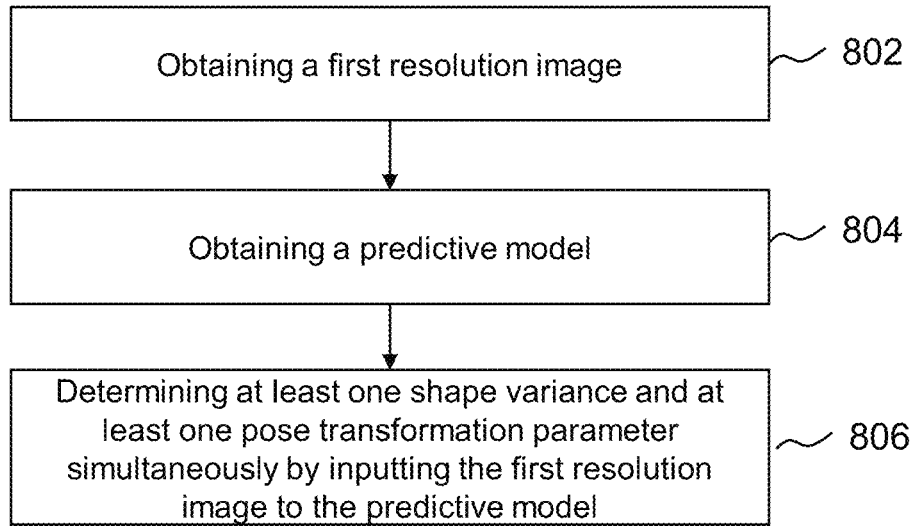
FIG. 8A is a flowchart illustrating an exemplary process for determining one or more shape parameters according to some embodiments of the present disclosure.

FIG. 8A is a flowchart illustrating an exemplary process for determining one or more shape parameters according to some embodiments of the present disclosure. In some embodiments, process 800 may be implemented in the imaging system 100 illustrated in FIG. 1. For example, the process 800 may be stored in a storage device (e.g., the storage device 150, or the storage 320 of the processing device 140) as a form of instructions, and can be invoked and/or executed by the processing device 140 (e.g., the processor 310 of the processing device 140, or one or more modules in the processing device 140 illustrated in FIG. 5). The operations of the illustrated process 800 presented below are intended to be illustrative. In some embodiments, the process 800 may be accomplished with one or more additional operations not described, and/or without one or more of the operations discussed. Additionally, the order in which the operations of the process 800 as illustrated in FIG. 8A and described below is not intended to be limiting.

In 802, the processing device (e.g., the acquisition module 502 of the processing device 140) may obtain a first resolution image. The first resolution image may be an LR image or a HR image. Merely for the illustrative purposes, the first resolution image is designated as the LR image. For example, the acquisition module 502 may obtain the LR image from the scanner 110. As another example, the acquisition module 502 may retrieve, from a storage device (e.g., the storage device 150), the LR image that is previously acquired by the scanner 110. In some embodiments, during the scan of a subject, for example, in cine MRI, the MRI scanner may generate an image sequence of a plurality of LR images in order to achieve a short scan time. In some embodiments, the LR image may be 2D image or 3D image (also referred as 3D volume or volumetric image). Merely for illustration, the LR image may be the 3D volume (e.g., the 3D CMR volume shown in FIG. 6). Each of the plurality of the LR images may be an image frame corresponding to a time frame (e.g., a cardiac phase of a cardiac cycle). The LR image may include a target in the ROI of the subject. The target needs to be segmented from the LR image, that is to say, a shape of the target needs to be determined based on the LR image. More detailed descriptions of the first resolution image may be found elsewhere in the present disclosure (e.g., operation 702 of process 700), and not be repeated herein.

Figure 8B:
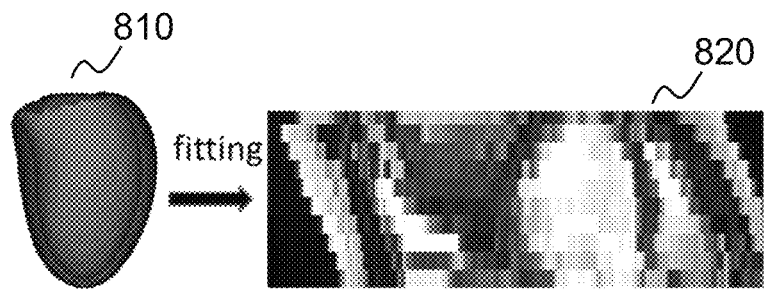
FIG. 8B is a schematic diagram of illustration of fitting a shape of a target to low resolution data according to some embodiments of the present disclosure.

In 804, the processing device (e.g., the acquisition module 502 of the processing device 140) may obtain a predictive model. For example, the predictive model may be a target shape parameter predictive model (SPPM) for predicting one or more shape parameters regarding the shape of the target. The one or more shape parameters may include at least one shape variance and at least one pose transformation parameter. As used herein, the SPPM may be constructed based on a single machine learning model. Merely for illustration, the single machine learning model may be a CNN model. The target SPPM may be generated by training an initial model (e.g., an initial SPPM) based on a plurality of pairs of data from a plurality of samples. A sample may include data from a sample subject. A sample subject may be the subject under an examination as describe in, e.g., FIG. 7 of the present disclosure, or a patient with a heart disease. The sample may be an HR 3D volume and/or an LR 3D volume, which includes the target. Merely for illustration, one of the plurality of samples may be an LR 3D volume including the target (e.g., the heart). Each of the plurality of pairs of data may include LR data corresponding to the LR 3D volume and an HR mesh surface corresponding to the LR sample image. The HR mesh surface may be prior knowledge. Taking LR CMR volume as an example, as shown in FIG. 8B, LR CMR volume 810 may be fitted to LR CMR data 820 via, e.g., an active shape model and an active appearance model. The plurality of pairs of data may be input to the initial SPPM for training. In some embodiments, the LR 3D volume may be preprocessed, for example, segmenting the target from the LR 3D volume. The segmented target from the LR 3D volume may be fitted to the LR data for training. In some embodiments, a trained model may be designated as the target SPPM when a condition (e.g., a termination condition) is satisfied. During the training, the processing device (e.g., the first predictive model determination module 508) may iteratively update parameters of the model to minimize a loss function of a current model using a machine learning algorithm (e.g., a stochastic gradient descent (SGD) algorithm). The loss function may be a regression loss function including, e.g., a mean square error (MSE) function, a mean absolute error (MAE) function, a Huber loss function, a Log-cos h loss function, a quantile loss function, or the like. Exemplary termination conditions may include that the loss function of the initial model that includes the updated parameters falls below a first threshold, that an iteration count of the iterative process reaches or exceeds a second threshold, that the loss function of the initial model that includes the updated parameters converges, etc. When the iterative training process satisfies a termination condition, the processing device may designate the trained model as the target SPPM. In some embodiments, the target SPPM may be a CNN model (e.g., CNN model 1100 illustrated in FIG. 11). In some embodiments, the trained model may be stored in a storage device (e.g., the storage device 150). The processing device may obtain the target SPPM from the storage device. More descriptions of generating the predictive model may be found elsewhere in the present disclosure (e.g., FIG. 10 and/or FIG. 11, and the descriptions thereof).

In 806, the processing device (e.g., the shape parameter determination module 504 of the processing device 140) may determine at least one shape variance and at least one pose transformation parameter simultaneously by inputting the LR image to the predictive model (e.g., the target SPPM).

Figure 8C:
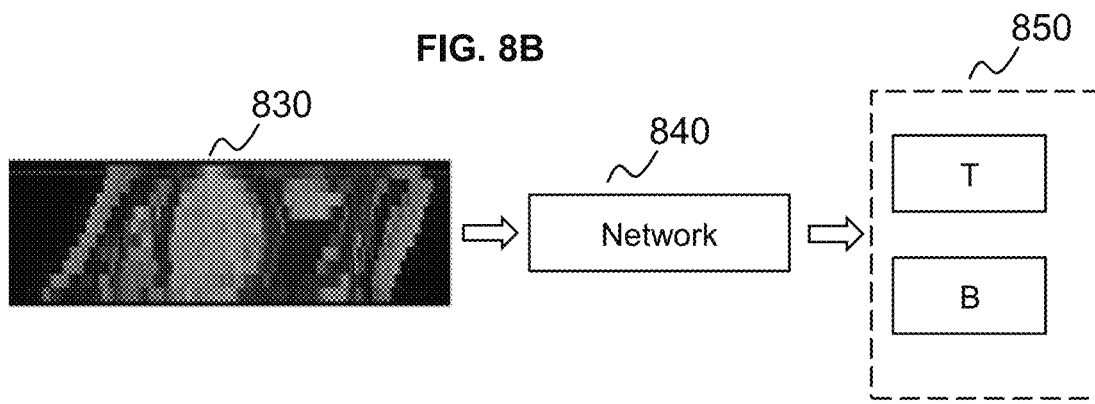
FIG. 8C is a schematic diagram illustrating a simplified scheme for determining one or more shape parameters with a predictive model according to some embodiments of the present disclosure.

FIG. 8C illustrates a simplified scheme for determining the one or more shape parameters with a predictive model according to some embodiments of the present disclosure. As shown in FIG. 8C, reference numeral 830 denotes the first resolution data corresponding to the input first resolution image (e.g., LR data corresponding to the input LR image), reference numeral 840 denotes a network model (e.g., the CNN model-based SPPM) for predicting the shape parameters regarding the shape of the target in the first resolution image (e.g., the LR image), and reference numeral 850 denotes the predicted shape parameters. The predicted shape parameters 850 may include the shape variance (B) and the pose transformation parameter (T). In some embodiments, the pose transformation parameter may be an affine transformation matrix. The affine transformation matrix may include a translation coefficient (e.g., a translation matrix), a rotation coefficient (e.g., a rotation matrix), a scaling coefficient (e.g., a scaling matrix), or the like, or any combination thereof. The pose transformation parameter may be represented as the affine transformation matrix. The network model 840 may process the first resolution data 830 to generate the affine transformation matrix T and the shape variance B simultaneously. In some embodiments, the generated affine transformation matrix T and the shape variance B may be sent to the processing device (e.g., the first shape determination module 506). The processing device may determine a shape vector of the target based on a shape model (e.g., Equation (1)). The shape may be segmented based on the shape vector. The processing device (e.g., the render module 507) may render the shape of the target to generate a second resolution visual representation of the target (e.g., an HR 3D model of the shape). In some embodiments, the second resolution may be higher than the first resolution. In some embodiments, the second resolution may be same as the first resolution.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, operations 802 and 804 may be integrated into a single operation.

Figure 9A:
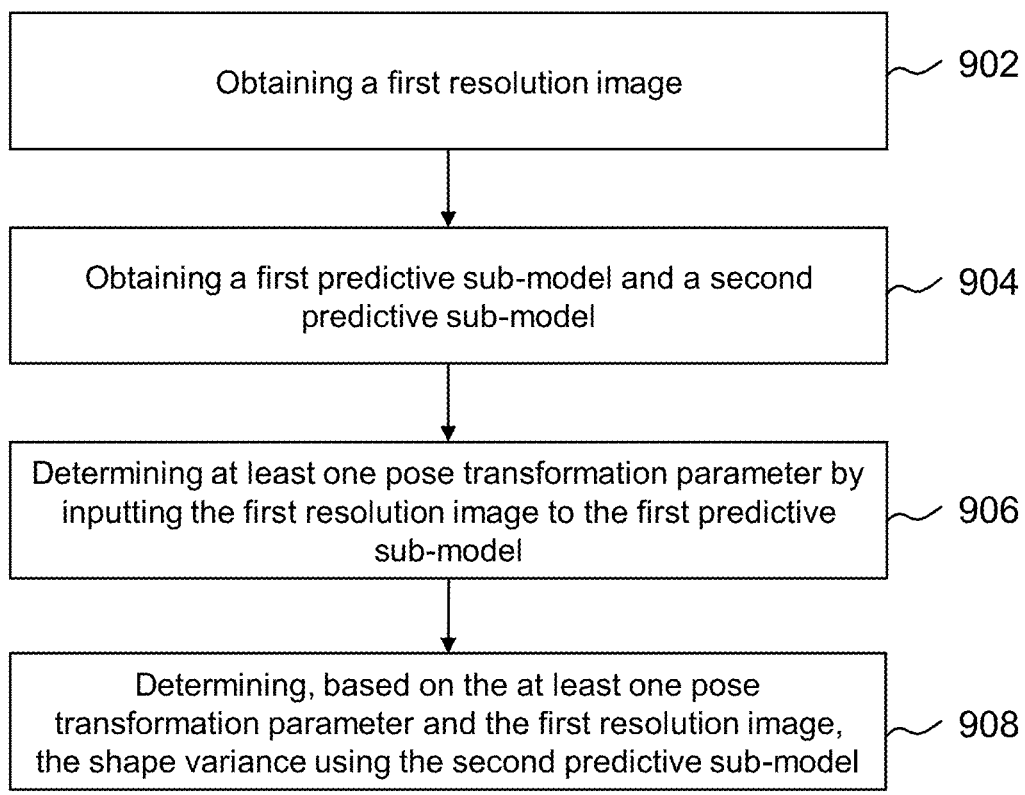
FIG. 9A is a flowchart illustrating an exemplary process for determining one or more shape parameters according to some embodiments of the present disclosure.

FIG. 9A is a flowchart illustrating an exemplary process for determining one or more shape parameters according to some embodiments of the present disclosure. In some embodiments, process 900 may be implemented in the imaging system 100 illustrated in FIG. 1. For example, the process 900 may be stored in a storage device (e.g., the storage device 150, or the storage 320 of the processing device 140) as a form of instructions, and can be invoked and/or executed by the processing device 140 (e.g., the processor 310 of the processing device 140, or one or more modules in the processing device 140 illustrated in FIG. 5). The operations of the illustrated process 900 presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 902, the processing device (e.g., the acquisition module 502 of the processing device 140) may obtain a first resolution image. The first resolution image may be an LR image or an HR image. Merely for the illustrative purposes, the first resolution image is designated as the LR image. For example, the acquisition module 502 may obtain the LR image from the scanner 110. As another example, the acquisition module 502 may retrieve, from a storage device (e.g., the storage device 150), the LR image that is previously acquired by the scanner 110. In some embodiments, during the scan of a subject, for example, in cine MRI, the MRI scanner may generate an image sequence of a plurality of LR images in order to achieve a short scan time. In some embodiments, the LR image may be 2D image or 3D image (also referred as 3D volume or volumetric image). Merely for illustration, the LR image may be the 3D volume (e.g., the 3D CMR volume shown in FIG. 6). Each of the plurality of the LR images may be an image frame corresponding to a time frame (e.g., a cardiac phase of a cardiac cycle). The LR image may include a target in the ROI of the subject. The target needs to be segmented from the LR image, that is to say, a shape of the target needs to be determined based on the LR image. More detailed descriptions of the first resolution image may be found elsewhere in the present disclosure (e.g., operation 702 of process 700), and not be repeated herein.

In 904, the processing device (e.g., the acquisition module 502 of the processing device 140) may obtain a first predictive sub-model (also referred to as a pose transformation parameter predictive model) and a second predictive sub-model (also referred to as a shape variance predictive model). The first predictive sub-model and the second predictive sub-model may be combined to construct a shape parameter predictive model (SPPM). In some embodiments, the first predictive sub-model may be used to generate at least one pose transformation parameter (e.g., T), and the second predictive sub-model may be used to generate a shape variance (e.g., B). In some embodiments, both the first predictive sub-model and the second predictive sub-model may be based on a same type of machine learning model. For example, both the first predictive sub-model and the second predictive sub-model are based on a CNN model. In some embodiments, the first predictive sub-model and the second predictive sub-model and the second predictive sub-model may be based on different types of machine learning models. For example, the first predictive sub-model may be based on a CNN model, while the second predictive sub-model may be based on a decision tree model. As used herein, the first predictive sub-model and the second predictive sub-model may be constructed based on the CNN model, respectively. The first predictive sub-model and the second predictive sub-model may form an end-to-end network model (e.g., network 1 and network 2 illustrated in FIG. 9B or FIG. 9C).

Figure 9B:
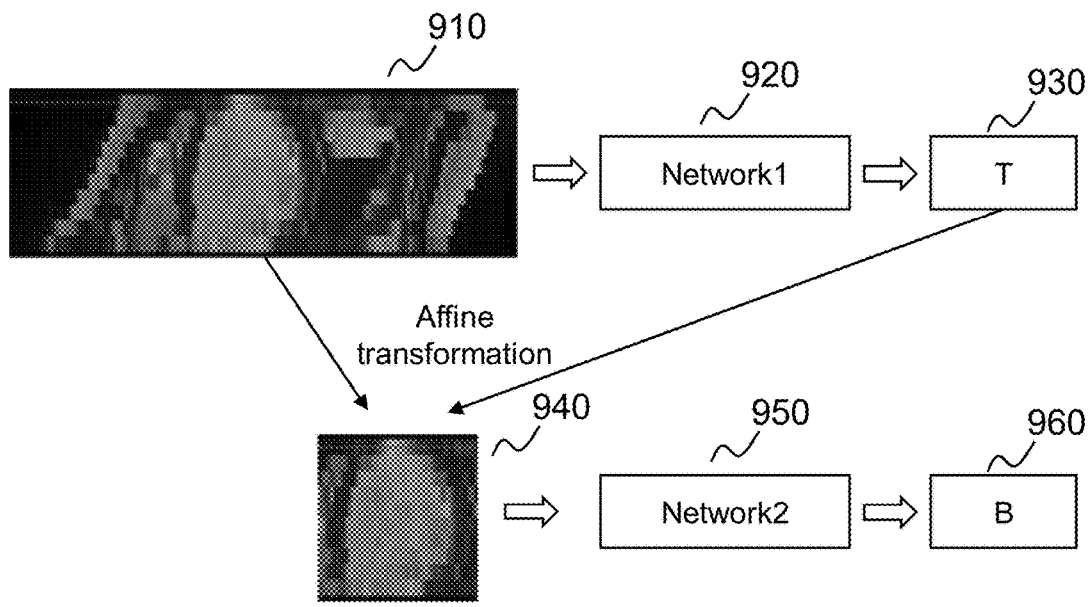
FIG. 9B is a schematic diagram illustrating a simplified scheme for determining one or more shape parameters with a predictive model according to some embodiments of the present disclosure.
Figure 9C:
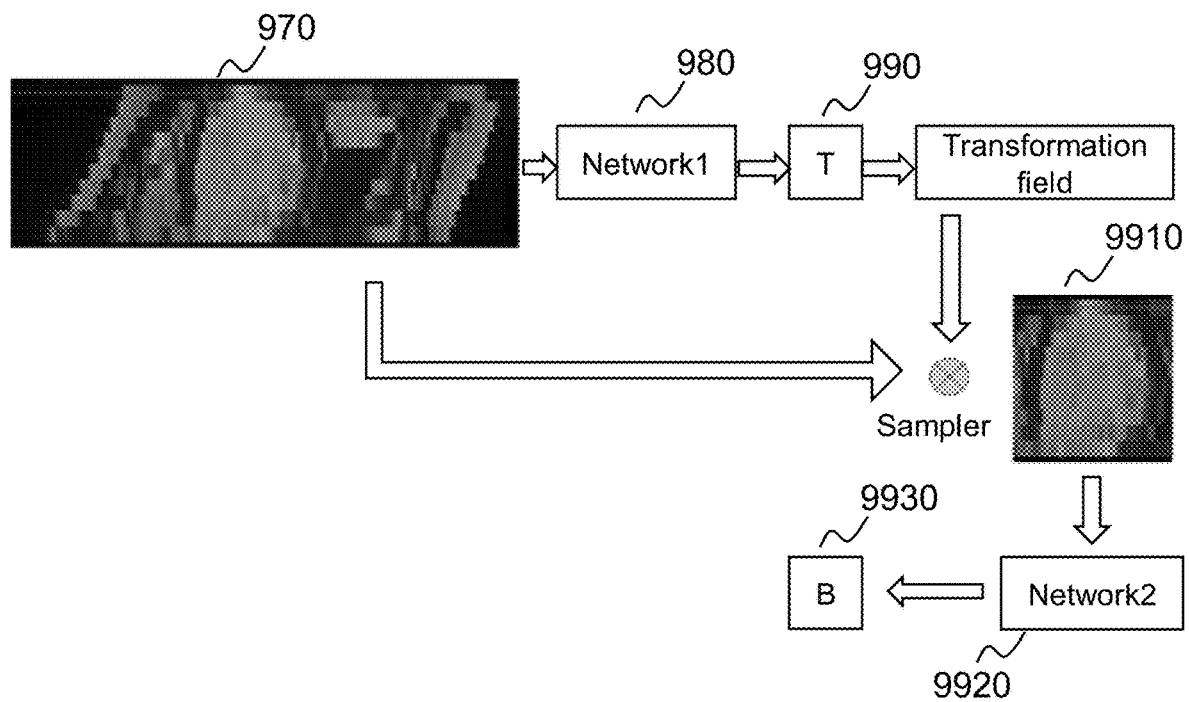
FIG. 9C is a schematic diagram illustrating another simplified scheme for determining one or more shape parameters with a predictive model according to some embodiments of the present disclosure.

In some embodiments, the first predictive sub-model and the second predictive sub-model may be generated by training a first initial model (also referred to as an initial pose transformation parameter predictive model) and a second initial model (also referred to as an initial shape variance predictive model), separately. In some embodiments, the first initial model may be trained based on a plurality of pairs of data from a plurality of samples. A sample may include data from a sample subject. A sample subject may be the subject under an examination as describe in, e.g., FIG. 7 of the present disclosure, or a patient with a heart disease. The sample may be an HR 3D volume and/or an LR 3D volume, which includes the target. Merely for illustration, one of the plurality of samples may be an LR 3D volumes including the target (e.g., the heart). Each of the plurality of pairs of data may include LR data corresponding to the LR 3D volume and an HR 3D mesh surface corresponding to the LR 3D volume. The HR 3D mesh surface may be determined based on a prior knowledge. For instance, the HR 3D model may be represented via a statistic shape model (e.g., Equation (1)). The LR data may be input to the first initial model for training. In some embodiments, the LR 3D volume may be preprocessed, for example, segmenting the target from the LR 3D volume. The segmentation of the target of the LR 3D volume may be used for training. During the training, the processing device (e.g., the first predictive model determination module 508) may iteratively update parameters of the model to minimize a first loss function of the current first model using a machine learning algorithm (e.g., a stochastic gradient descent (SGD) algorithm). The first loss function may be a regression loss function including, e.g., a mean square error (MSE) function, a mean absolute error (MAE) function, a Huber loss function, a Log-cos h loss function, a quantile loss function, or the like. When the iterative training satisfies a termination condition, the processing device may designate the trained first initial model as the first predictive sub-model. The first predictive sub-model may output the pose transformation parameter (e.g., T). The pose transformation parameter may be an affine transformation matrix. In some embodiments, a combination of the input and the output of the first predictive sub-model may be taken as an input for training the second predictive sub-model. For example, as shown in FIG. 9B, input first resolution data 910 and output pose transformation parameter 930 (e.g., the affine transformation matrix) may be used to determine one image patch 940. The image patch may correspond to a portion of the LR data 910. A plurality of image patches corresponding to a plurality of LR images may be generated similarly. The plurality of image patches may be taken as training data for the second predictive sub-model (e.g., network2 950). As another example, as shown in FIG. 9C, output pose transformation parameter 990 (e.g., the affine transformation matrix) may be used to create a transformation field using a grid generator (not shown). In some embodiments, the transformation field may include a sampling grid, which is a set of points where the input LR data 970 is sampled to produce the transformed output. The input LR data 970 and the sampling grid are taken as inputs to the sampler to produce an image patch 9910. A plurality of image patches corresponding to a plurality of LR images may be generated similarly. The plurality of image patches may be taken as training data for the second predictive sub-model (e.g., network2 9920). During the training process, the processing device may iteratively update parameters of the model to minimize a second loss function of the current second model using a machine learning algorithm (e.g., a stochastic gradient descent (SGD) algorithm). The second loss function may be a regression loss function, which is the same as or similar to the first loss function. When the iterative training satisfies a termination condition, the processing device may designate the trained second initial model as the second predictive sub-model. The second predictive sub-model may output the shape variance (e.g., B).

In some embodiments, the first predictive sub-model and the second predictive sub-model may be generated by training the first initial model and the second initial model jointly. For example, during the training, when the first loss function and the second loss function satisfy the termination condition simultaneously, the processing device may designate the trained first initial model and the trained second initial model as the first predictive sub-model and the second predictive sub-model, respectively. If at least one of the first loss function or the second loss function fails to satisfy the termination condition, the processing device may continue to train the first initial model and the second initial model until the termination condition regarding the two loss functions is satisfied simultaneously.

In 906, the processing device (e.g., the shape parameter determination module 504 of the processing device 140) may determine at least one pose transformation parameter by inputting the first resolution image (e.g., the LR image) to the first predictive sub-model. In some embodiments, the pose transformation parameter may be an affine transformation matrix. The affine transformation matrix may include at least one of translation coefficients, rotation coefficients, or scale coefficients.

In 908, the processing device (e.g., the shape parameter determination module 504 of the processing device 140) may determine, based on the at least one pose transformation parameter and the first resolution image (e.g., the LR image), the shape variance using the second predictive sub-model.

Merely by way of example, FIG. 9B illustrates a simplified scheme for determining one or more shape parameters with a predictive model according to some embodiments of the present disclosure. The predictive model may be a target SPPM including the first predictive sub-model and the second predictive sub-model. The first predictive sub-model and the second predictive sub-model may be CNN models, such as, network1 920 and network2 950 shown in FIG. 9B. As illustrated in FIG. 9B, first resolution data 910 (e.g., LR data of a 3D LR volume) may be taken as an input of the network1 920 (i.e., the first predictive sub-model). The first predictive sub-model may output the pose transformation parameter T 930. In some embodiments, the pose transformation parameter may be represented as the affine transformation matrix. In some embodiments, the output pose transformation parameter may be stored in a storage device (e.g., the storage device 150). In some embodiments, the first resolution data (e.g., the LR data) 910 and the pose transformation parameter may be combined to determine an image patch 940. Specifically, the image patch 940 may be determined by affine transforming the first resolution data (e.g., the LR data) 910 with the affine transformation matrix. The image patch 940 may be a portion of the first resolution data (e.g., the LR data) 910. The image patch 940 may include at least one portion of the target in the subject (e.g., the LV of the heart, or the RV of the heart). The image patch 940 may be taken as an input of the network2 950 (i.e., the second predictive sub-model). The second predictive sub-model may output the shape variance B 960. In some embodiments, the output shape variance may be stored in a storage device (e.g., the storage device 150).

Merely by way of example, FIG. 9C illustrates another simplified scheme for determining one or more shape parameters with a predictive model according to some embodiments of the present disclosure. Similar to FIG. 9B, the predictive model may be the target SPPM including the first predictive sub-model and the second predictive sub-model. The first predictive sub-model and the second predictive sub-model may be CNN models, such as, network1 980 and network2 9920 shown in FIG. 9C. As illustrated in FIG. 9C, first resolution data 970 (e.g., LR data of a 3D LR volume) may be taken as an input of network1 980 (i.e., the first predictive sub-model). The first predictive sub-model may output the pose transformation parameter T 990. In some embodiments, the pose transformation parameter may be represented as the affine transformation matrix. In some embodiments, the output pose transformation parameter may be stored in a storage device (e.g., the storage device 150). In some embodiments, the pose transformation parameter may be used to create the transformation field using a grid generator. The transformation field may include a sampling grid, which is a set of points where the first resolution data (e.g., the LR data) 970 should be sampled to produce the transformed output. The first resolution data (e.g., the LR data) 970 and the sampling grid may be input to the sampler to produce an image patch 9910. The image patch 9910 may be a portion of the first resolution data (e.g., the LR data) 970. The image patch 9910 may include at least one portion of the target in the subject (e.g., the LV in the heart, or the RV of the heart). The image patch 9910 may be taken as an input of network2 9920 (i.e., the second predictive sub-model). The second predictive sub-model may output the shape variance B 9930. In some embodiments, the output shape variance may be stored in a storage device (e.g., the storage device 150).

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, in operation 904, the first predictive sub-model and the second predictive sub-model may be obtained separately.

Figure 10:
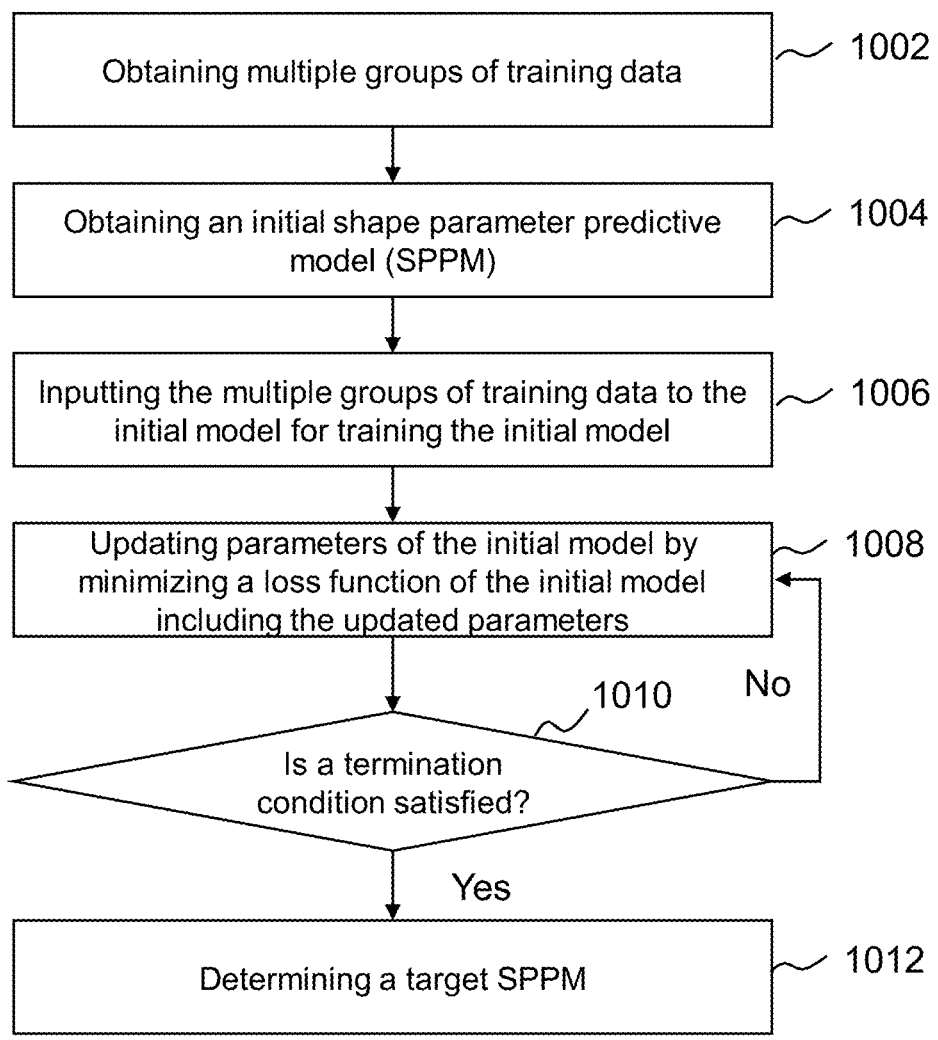
FIG. 10 is a flowchart illustrating an exemplary process for determining a predictive model for predicting one or more shape parameters according to some embodiments of the present disclosure.

FIG. 10 is a flowchart illustrating an exemplary process for determining a target predictive model for predicting one or more shape parameters according to some embodiments of the present disclosure. As used herein, the predictive model may be referred to as a shape parameter predictive model (SPPM). In some embodiments, process 1000 may be implemented in the imaging system 100 illustrated in FIG. 1. For example, the process 1000 may be stored in a storage device (e.g., the storage device 150, or the storage 320 of the processing device 140) as a form of instructions, and can be invoked and/or executed by the processing device 140 (e.g., the processor 310 of the processing device 140, or one or more modules in the processing device 140 illustrated in FIG. 5). The operations of the illustrated process 1000 presented below are intended to be illustrative. In some embodiments, the process 1000 may be accomplished with one or more additional operations not described, and/or without one or more of the operations discussed. Additionally, the order in which the operations of the process 1000 as illustrated in FIG. 10 and described below is not intended to be limiting.

In 1002, the processing device (e.g., the acquisition module 502 of the processing device 140) may obtain multiple groups of training data. The multiple groups of training data may be associated with a plurality of samples. Each of the plurality of samples may include an MR image including a target (e.g., the heart) of a sample subject. In some embodiments, the MR image may be a low-resolution (LR) image or high-resolution (HR) image. In some embodiments, the MR image may be 2D image or 3D image (also referred as 3D volume or volumetric image). As used herein, a plurality of LR 3D volumes may be selected as training samples. The multiple groups of training data associated with the training samples may form a training set. In some embodiments, the sample images included in the training set may be preprocessed. For instance, each of the sample images may need to fit a model architecture (e.g., the CNN architecture), and one or more of the sample images whose original sizes do not fit the model architecture need to be resized to fit the model architecture. As another example, the sample images may need to be of a same dimension, for example, 192×192×80, and one or more of the sample images whose original dimensions are different need to be reshaped to this dimension. Each of the multiple groups of training data may include a pair of data. The pair of data may include LR data corresponding to the LR 3D volume and HR 3D mesh surface corresponding to the LR 3D volume. In some embodiments, the LR 3D volume included in the pair of data may also be processed by, for example, segmenting the target from the LR 3D volume. The segmentation of the target from the LR 3D volume may be used for training.

In 1004, the processing device (e.g., the acquisition module 502 of the processing device 140) may obtain an initial model (e.g., an initial SPPM). In some embodiments, the initial SPPM may be stored in a storage device as an application or a portion thereof. For example, the acquisition module 502 may obtain the initial SPPM from the storage device (e.g., the storage device 150).

The initial SPPM may be a machine learning regression model. Exemplary machine learning regression models may include a decision tree model, a deep learning neural network model, a regression tree model, a random forest model, or the like, or a combination thereof. Exemplary deep learning neural network models may include a convolutional machine learning model (CNN), a fully convolutional neural network (FCN) model, a generative adversarial network (GAN), a back propagation (BP) machine learning model, a radial basis function (RBF) machine learning model, a deep belief nets (DBN), an Elman machine learning model, or the like, or a combination thereof. In some embodiments, the machine learning regression model may include multiple layers, for example, an input layer, multiple hidden layers, and an output layer. The multiple hidden layers may include one or more convolutional layers, one or more pooling layers, one or more batch normalization layers, one or more activation layers, one or more fully connected layers, a cost function layer, etc. Each of the multiple layers may include a plurality of nodes. The machine learning regression model may be trained to take the LR image and/or LR data corresponding to the LR image as input(s) and one or more shape parameters as output(s). The one or more shape parameters may include a shape variance coefficient and pose transformation parameter(s).

In some embodiments, the machine learning model may be defined by a plurality of architecture parameters and a plurality of learning parameters. The plurality of learning parameters may be altered during the training of the machine learning model using the multiple groups of training data, while the plurality of architecture parameters may not be altered during the training of the machine learning model using the multiple groups of training data. The plurality of architecture parameters may be set and/or adjusted by a user before the training of the machine learning model. Exemplary architecture parameters of the machine learning model may include the size of a kernel of a layer, the total count (or number) of layers, the count (or number) of nodes in each layer, a learning rate, a minibatch size, an epoch, etc. Exemplary learning parameters of the machine learning model may include a connected weight between two connected nodes, a bias vector relating to a node, etc. The connected weight between two connected nodes may be configured to represent a proportion of an output value of a node to be as an input value of another connected node. The bias vector relating to a node may be configured to control an output value of the node deviating from an origin.

In some embodiments, the initial SPPM may be generated by initializing the plurality of learning parameters of a machine learning regression model (e.g., the CNN model). The parameter values of the plurality of learning parameters may be initialized, set, and/or adjusted before the training of the machine learning model to obtain an initialized machine learning model. Exemplary learning parameters of the machine learning model may include the size of a kernel of a layer, the total count (or number) of layers, the count (or number) of nodes in each layer, a learning rate, a batch size, an epoch, a connected weight between two connected nodes, a bias vector relating to a node, etc.

In 1006, the processing device (e.g., the first predictive model determination module 508 of the processing device 140) may input the multiple groups of training data to the initial SPPM for training the model. For example, the first predictive model determination module 508 may obtain the multiple groups of training data and the initial SPPM from the acquisition module 502. The first predictive model determination module 508 may input the training data to the initial SPPM.

In some embodiments, the processing device may train the initial SPPM using a machine learning algorithm. Exemplary machine learning algorithm may include a gradient descent algorithm, a Newton's algorithm, a Quasi-Newton algorithm, a Levenberg-Marquardt algorithm, a conjugate gradient algorithm, or the like, or a combination thereof. For example, the initial SPPM may be trained by the stochastic gradient descent (SGD) algorithm. In some embodiments, the processing device may perform one or more iterations to train the initial SPPM. The one or more iterations may be performed to update the plurality of learning parameters of the initial SPPM until a termination condition is satisfied. For example, the termination condition may be satisfied when the loss function of the initial model that includes the updated parameters falls below a first threshold. As another example, the termination condition may be satisfied when an iteration count of the iterative process exceeds a second threshold. As a further example, the termination condition may be satisfied when the loss function of the initial model that includes the updated parameters converges. The convergence may be deemed to have occurred if the variation of the values of the loss function in two or more consecutive iterations is smaller than a value (or approximating to a constant value).

In each of the one or more iterations, the processing device may, according to the SGD algorithm, update parameters of the initial SPPM to minimize a loss function of the initial model that includes the updated parameters (as illustrated in operation 1008). In some embodiments, the initial model that includes the updated parameters may refer to a current model in a current training round. The loss function may measure how far away an output solution (e.g., a predicted value) is from an optimal solution (e.g., a ground truth). The loss function may be a regression loss function, such as, including a mean square error (MSE) function, a mean absolute error (MAE) function, a Huber loss function, a Log-cos h loss function, a quantile loss function, or the like. Merely for illustration, the MSE function may be selected as the loss function of the model. The MSE function may be described according Equation (5) as follows:

$$MSE = \Sigma_{i=1}^{n} (y_i - y_i^p)^2 / n, \quad (5)$$

where n denotes the number (or count) of training samples, $y_i$ denotes the ground truth associated with the training sample (e.g., the pose transformation parameter and the shape variance associated with the training sample), and $y_i^p$ denotes the predicted value of the model (e.g., the predicted pose transformation parameters (T) and the predicted shape variance (B). In some embodiments, the ground truth may be determined based on an affine transformation between a shape of the target of a sample and a mean shape of shapes of the target in the training samples. For the training samples, each shape of the target may be obtained. The mean shape may be a mean of the shapes of the target (referring to the Procrustes analysis). The ground truth may be determined by transforming each shape of the target to the mean shape space, for example, via an active shape model (ASM) or an image registration algorithm.

The processing device may determine a training loss value based on the loss function (e.g., Equation (5)) in each training round. In some embodiments, the processing device may iteratively update, based on the training loss value, the parameters of the model using the SGD algorithm until a termination condition is satisfied. In 1010, the processing device (e.g., the first predictive model determination module 508) may determine whether a termination condition is satisfied in each training round. For example, if the training loss value of the loss function of the model in a current training round falls below the first threshold, the training process may terminate. As another example, if an iteration count of the iterative process exceeds the second threshold, the training process may terminate. As a further example, if the loss function of the model in a current training round converges, the training process may terminate.

In 1012, when the training process is completed, the process device (e.g., the first predictive model determination module 508) may designate the current trained SPPM as a target predictive model (e.g., a target SPPM). In other words, the parameters of the current model may be designated as the parameters of the target SPPM. It should be noted that an accuracy of the designated target SPPM may be equal to or greater than a desired accuracy threshold (e.g., 80%, 85%, 90%, etc.). The accuracy of the target SPPM may be measured by verifying a validation set. The validation set is similar to the training set for training the SPPM. In the verification process using the validation set, if the accuracy of the designated target SPPM is not satisfied, the processing device may adjust the parameters of the designated target SPPM by training the model with new training data until the accuracy is deemed equal to or greater than the accuracy threshold, e.g., by a verification process.

Figure 11:
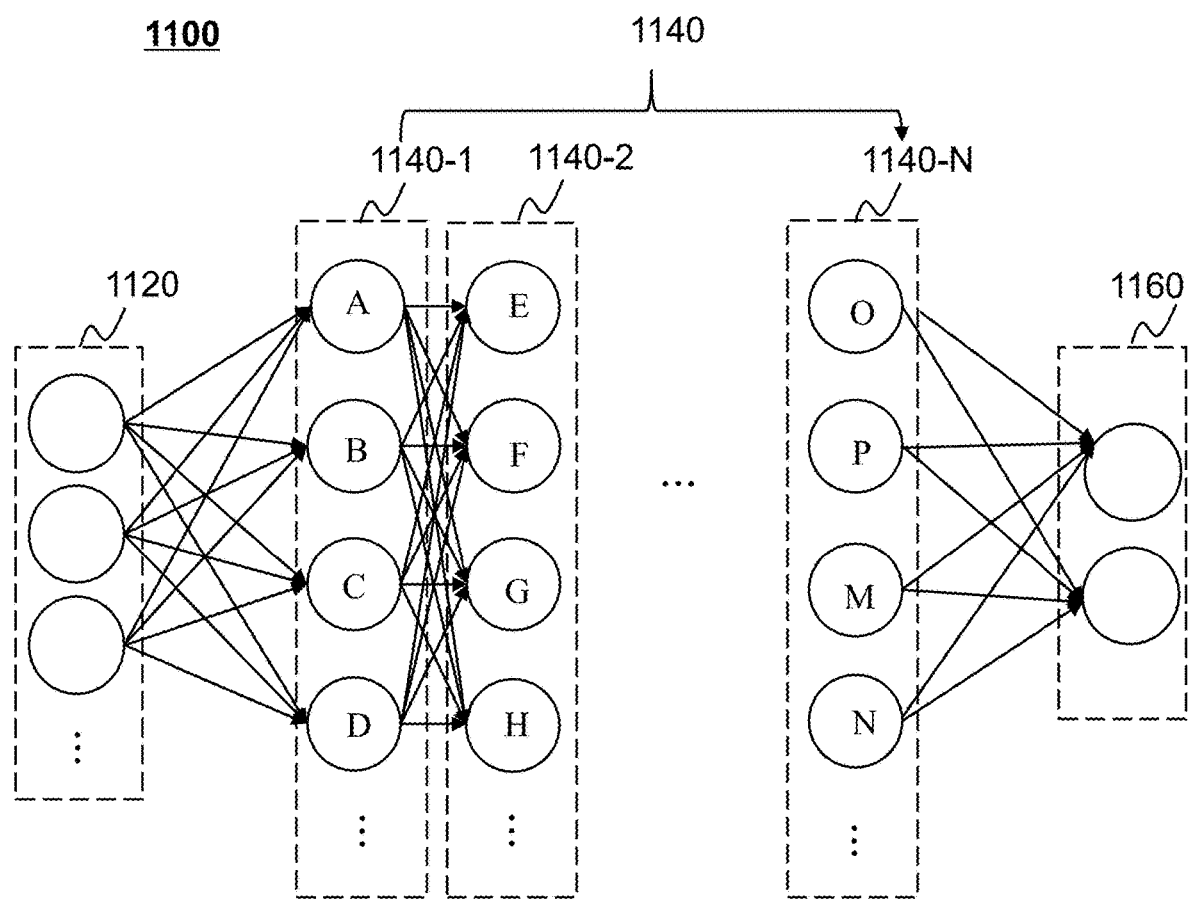
FIG. 11 is a schematic diagram illustrating an exemplary architecture of convolutional neural network (CNN) model according to some embodiments of the present disclosure.

Merely by way of example, the initial SPPM may be a CNN model. FIG. 11 illustrates an exemplary architecture of the CNN model according to some embodiments of the present disclosure. As shown in FIG. 11, CNN model 1100 may include an input layer 1120, hidden layers 1140, and an output layer 1160. The multiple hidden layers 1140 may include one or more convolutional layers, one or more Rectified Linear Units layers (ReLU layers), one or more pooling layers, one or more fully connected layers, or the like, or a combination thereof.

As used herein, a layer of a model may refer to an algorithm or a function for processing input data of the layer. Different layers may perform different kinds of processing on their respective input. A successive layer may use output data from a previous layer of the successive layer as input data. In some embodiments, each of the layer may include one or more nodes (e.g., neural units). In some embodiments, each node may be connected to one or more nodes in a previous layer. The number of nodes in each layer may be the same or different. In some embodiments, each node may correspond to an activation function. As used herein, an activation function of a node may define an output of the node given an input or a set of inputs. The activation function may include a sigmoid function, a tan h function, a ReLU function, an ELU function, a PReLU function, or the like, or any combination thereof.

In some embodiments, the plurality of nodes may be configured to process input data. In a neural network model, a node may refer to a neural unit. For example, a neural unit may output a value according to Equation (6) as follows:

$$f_{output} = f(\Sigma_i w_i x_i + b), \quad (6),$$

where $f_{output}$ denotes an output value of a neural unit, $f(\cdot)$ denotes an activation function, $w_i$ denotes a weight corresponding to an element of an input vector, $x_i$ denotes an element of an input vector, and b denotes a bias term corresponding to the input vector. The weights and the bias terms may be parameters of the CNN model. In some embodiments, the weights and the bias terms may be iteratively updated based on the SGD algorithm.

For illustration purposes, as shown in FIG. 11, exemplary hidden layers 1140 of the CNN model 1100, including a convolutional layer 1140-1, a pooling layer 1140-2, and a fully connected layer 1140-N, are illustrated. As described in connection with process 1000, the processing device 140 may acquire the training set as an input of the input layer 1120. The input training data may be in the form of a vector. The convolutional layer 1140-1 may include a plurality of convolutional kernels (e.g., A, B, C, and D). For example, the number (or count) of the plurality of convolutional kernels may be in a range from 16 to 64, for example, 32. The plurality of convolutional kernels may be used to perform convolutional operation for outputs from a previous layer (e.g., the input layer 1120). In some embodiments, each of the plurality of convolutional kernels may filter a portion (e.g., a region) of the input vector to achieve data dimensionality reduction.

The pooling layer 1140-2 may take the output of the convolutional layer 1140-1 as an input. The pooling layer 1140-2 may include a plurality of pooling nodes (e.g., E, F, G, and H). Each of the plurality of pooling nodes may perform a pooling operation for its inputs, such as a max pooling, an average pooling or L2-norm pooling. For example, the plurality of pooling nodes may be used to sample the output of the convolutional layer 1140-1, and thus may reduce the computational load of data processing and increase the speed of data processing of the MRI system 100.

The fully connected layer 1140-N may include a plurality of neural units (e.g., O, P, M, and N). The plurality of neural units in the fully connected layer 1140-N may have full connections to all activations in the previous layer, and output vectors. The output layer 1160 may determine outputs based on the output vectors of the fully connected layer 1140-N and the corresponding weights and bias terms obtained in the fully connected layer 1140-N. The output values may be designated as the shape variance and the pose transformation parameters.

In some embodiments, the processing device may get access to multiple processing units, such as GPUs, in the MRI system 100. The multiple processing units may perform parallel processing in some layers of the CNN model. The parallel processing may be performed in such a manner that the calculations of different nodes in a layer of the CNN model may be assigned to two or more processing units. For example, one GPU may run the calculations corresponding to kernels A and B, and the other GPU(s) may run the calculations corresponding to kernels C and D in the convolutional layer 1140-1. Similarly, the calculations corresponding to different nodes in other type of layers in the CNN model may be performed in parallel by the multiple GPUs.

As described in connection with FIG. 6, in clinical applications, the cine MRI may provide a visualization of the target at different time frames. In cine MRI, an image sequence of a plurality of image frames may be generated. In some embodiments, for each of the plurality of image frames (e.g., the 3D CMR volume), the MRI system 100 may determine an HR segmentation of the target from the LR image based on the shape model (e.g., Equation (1)) and the target SPPM (e.g., the model illustrated in FIG. 8C, FIG. 9B or FIG. 9C). The segmented shape of the target may provide diagnostic information (e.g., the volume or the mass of the LV of the heart). For some targets (e.g., the heart or the lung) undergoing motion (e.g., heart motion, respiratory motion), the shapes of the target may vary over time. The correspondence between the shapes in the image frames may need to be tracked for diagnosis analysis. For example, strain estimation may be performed based on point correspondences in a myocardium region across different image frames. Strain analysis may be used to estimate the myocardium contraction and relaxation. The strain analysis may be a clinical measurement that facilitate an understanding and/or assessment of cardiac functions and/or a diagnosis decision by cardiologists. To provide rich diagnosis information, the imaging system 100 may be used to achieve one or more operations for tracking a change of the shape of the target over time.

Figure 12:
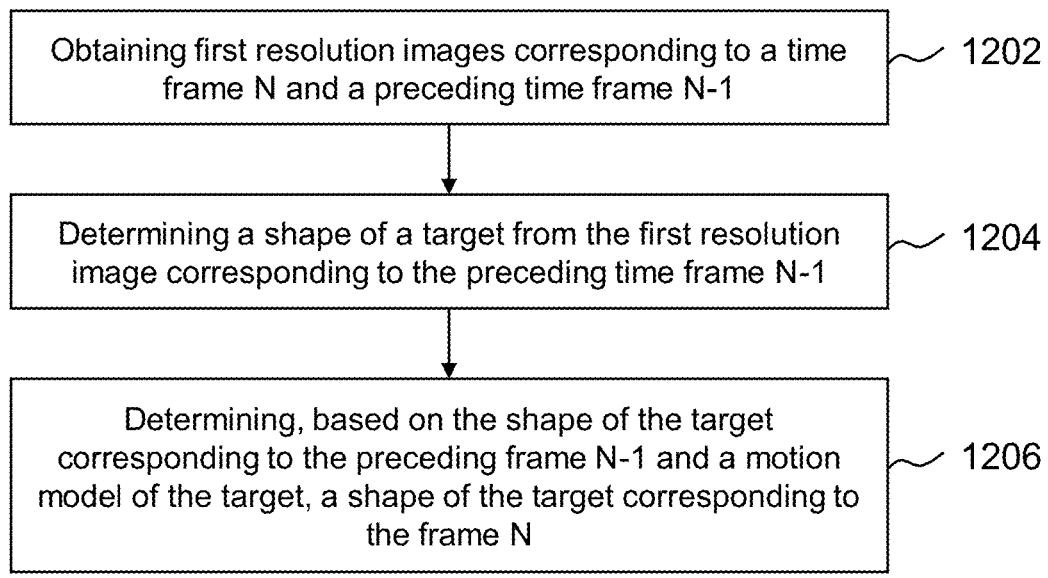
FIG. 12 is a flowchart illustrating an exemplary process for tracking a change of a shape of a target over time according to some embodiments of the present disclosure.

FIG. 12 is a flowchart illustrating an exemplary process for tracking a change of a shape of a target over time according to some embodiments of the present disclosure. In some embodiments, process 1200 may be implemented in the imaging system 100 illustrated in FIG. 1. For example, the process 1200 may be stored in a storage device (e.g., the storage device 150, or the storage 320 of the processing device 140) as a form of instructions, and can be invoked and/or executed by the processing device 140 (e.g., the processor 310 of the processing device 140, or one or more modules in the processing device 140 illustrated in FIG. 5). The operations of the illustrated process 1200 presented below are intended to be illustrative. In some embodiments, the process 1200 may be accomplished with one or more additional operations not described, and/or without one or more of the operations discussed. Additionally, the order in which the operations of the process 1200 as illustrated in FIG. 12 and described below is not intended to be limiting.

In 1202, the processing device (e.g., the acquisition module 502 of the processing device 140) may obtain first resolution images (e.g., LR images) corresponding to a time frame N (e.g., the second image frame $t_2$ shown in FIG. 6) and a preceding time frame N−1 (e.g., the first image frame $T_1$ shown in FIG. 6), where N is an integer that is equal to or greater than 2.

As described in connection with FIG. 6, in cine MRI, the MRI device (e.g., the MRI scanner) may acquire an image sequence of a plurality of image frames, each of which corresponds to a time frame. In some embodiments, the image frame may include a series of 2D slice images. In clinical applications, a relatively big slice thickness may be set in a scan protocol in order to reduce the scan time. The generated series of 2D slice images may be LR slice images due to the relatively big slice thickness. The LR 3D volume composed of the series of 2D LR slice images may be generated accordingly. In some embodiments, the image sequence may be stored in a storage device (e.g., the storage device 150). The acquisition module 502 may obtain one or more image frames from the storage device 150.

In 1204, the processing device (e.g., the first shape determination module 506 of the processing device 140) may determine a shape of a target from the first resolution image corresponding to the preceding time frame N−1.

In some embodiments, the processing device may determine the shape of the target (e.g., the heart or the lung) corresponding to the time frame N−1 based on the shape model (e.g., Equation (1)) and the target SPPM (e.g., the model illustrated in FIG. 8C, FIG. 9B or FIG. 9C). For example, the first shape determination module 506 may determine one or more shape parameters regarding the shape of the target in a first image frame using the target SPPM. The one or more shape parameters may include a shape variance coefficient (e.g., B illustrated in FIG. 8C, FIG. 9B or FIG. 9C) and at least one pose transformation parameter (e.g., T illustrated in FIG. 8C, FIG. 9B or FIG. 9C). In some embodiments, the pose transformation parameter may be an affine transformation parameter which transforms a mean shape from the mean shape space to the image space. The processing device 140 may determine the mean shape and the shape covariance matrix based on Equation (3) and Equation (4), respectively. The first eigen vector matrix may be derived from the shape covariance matrix. In some embodiments, the mean shape and the shape covariance matrix may be determined in advance. The first shape determination module 506 may input the shape parameters, the mean shape and the shape covariance matrix derived eigen vector matrix to Equation (1), and determine the shape of the target. The shape may be defined as a shape vector generated via the shape model. The shape vector may include coordinates of a plurality of landmarks regarding the target. A mesh surface of the target may be generated based on the plurality of landmarks. In some embodiments, the determined shape of the target corresponding to the preceding time frame N−1 may be input to a target motion parameter predictive model (MPPM) for determining motion parameters regarding the target at the current time frame N.

In 1206, the processing device (e.g., the second shape determination module 512 of the processing device 140) may determine, based on the shape of the target corresponding to the previous frame N−1 and a motion model of the target, a shape of the target corresponding to the frame N.

In some embodiments, the motion model may be used to determine a motion field regarding two consecutive image frames (e.g., a first image frame at N−1, and a second image frame at N). A segmentation of target of a previous image frame may be warped to the subsequent image frame according to the motion field. In some embodiments, the motion field may include a plurality of motion vectors. A motion vector of a voxel (or pixel) may denote the displacement of the voxel (or pixel) in an image compared to the corresponding voxel (or pixel) in another image. In other words, the motion field may describe point correspondence between the landmarks of the shape of the target in different image frames. For illustrative purposes, if the coordinates of a voxel in image frame A is (x,y,z), the motion filed of the voxel is ($\Delta x$, $\Delta y$, $\Delta z$), and due to the image deformation by the motion field from image frame A to image frame B, the corresponding voxels in image frame B and image frame A may be expressed as:

$$B(x+\Delta x, y+\Delta y, z+\Delta z) = A(x,y,z). \quad (7)$$

If the processing device may determine point correspondences between the shape of the preceding image frame and the current image frame, the shape of the target of the current image frame may be determined based on the point correspondence. For example, let the first image frame be a preceding image frame with respect to the second image frame, if the motion field between the first image frame and the second image frame is determined, the second shape determination module 512 may determine the shape of the target of the second image frame by applying the determined motion field to the shape of the first image frame.

In some embodiments, the motion field between the image frames may be determined according to the motion model defined by Equation (8) as follows:

$$f_{motion} = f_{mean\ motion} + B_m \times P_m, \quad (8)$$

where $f_{motion}$ denotes the motion field between two consecutive image frames, $f_{mean\ motion}$ denotes a mean motion regarding a plurality of shapes of the target at different time frames, $B_m$ denotes motion parameters, and $P_m$ denotes a second eigen vector matrix (i.e., a motion covariance matrix derived eigen vector matrix).

In some embodiments, the mean motion may be determined based on a plurality of sample cine image frames from a plurality of image sequences. An image sequence may include a plurality of 3D cine image frames. In some embodiments, the 3D image frame may be an HR volume and/or LR volume. Merely for illustration, an HR volume may be selected as the sample cine image frame. In some embodiments, the plurality of 3D image frames may be aligned to a same image space. Motion fields between the plurality of 3D image frames may be determined after the alignment procedure. In some embodiments, the mean motion may be determined based on a mean or average of the motion fields. For instance, let a motion field matrix be $m_i$, the number (or count) of the motion fields be n, and the mean motion be $\overline{m}$; the mean motion may be determined according to Equation (9) as follows:

$$f_{mean\ motion} = \overline{m} = \frac{1}{n}\sum_{i=1}^{n} m_i. \quad (9)$$

In some embodiments, the motion covariance matrix, $C_m$, may be determined based on the determined mean motion. For example, the motion covariance matrix may be determined according to Equation (10) as follows:

$$C_m = \frac{1}{n}\sum_{i=1}^{n}(m_i - \overline{m})^T \cdot (m_i - \overline{m}). \quad (10)$$

Eigen values and eigen vectors associated with the motion covariance matrix, $C_m$, may be computed via the PCA algorithm. The eigen vectors may correspond to the eigen values. The computed eigen values may be sorted from largest to smallest. Then the eigen vectors corresponding to the predetermined number (or counts) of eigen vectors (e.g., the top d eigen values) may be selected. The selected eigen vectors (e.g., the top d eigen vectors corresponding to the top d eigen values) may form the second eigen vector matrix, $P_m$.

Based on Equation (8), if these variables, $f_{mean\ motion}$, $B_m$, and $P_m$ are known, $f_{motion}$ may be determined. In some embodiments, the motion parameters, $B_m$, may be determined using the target MPPM. In some embodiments, the target MPPM may be a machine learning regression model similar to the SPPM as described. Exemplary machine learning regression models may include a decision tree model, a deep learning neural network model, a regression tree model, a random forest model, or the like, or a combination thereof. Exemplary deep learning neural network models may include a convolutional neural network model (CNN), multi-layer perceptron (MLP) neural network, a fully convolutional neural network (FCN) model, a generative adversarial network (GAN), a back propagation (BP) machine learning model, a radial basis function (RBF) machine learning model, a deep belief nets (DBN), an Elman machine learning model, or the like, or a combination thereof. In some embodiments, the target MPPM may be generated by training an initial model (e.g., an initial MPPM) based on a plurality of image pairs from the cine image frames. For example, each of the plurality of image pairs may include a first first resolution image (e.g., a first LR image) corresponding to a first time frame M−1 and a second first resolution image (e.g., a second LR image) corresponding to a second time frame M, where M is an integer equal to or greater than 2. The first first resolution image frame and the second first resolution image frame are two consecutive image frames. In some embodiments, a trained model may be designated as the target MPPM when a condition (e.g., a termination condition) is satisfied.

The processing device (e.g., the second shape determination module 512) may take the preceding image frame and the current image frame as inputs of the target MPPM, and output the motion parameters.

Figure 13:
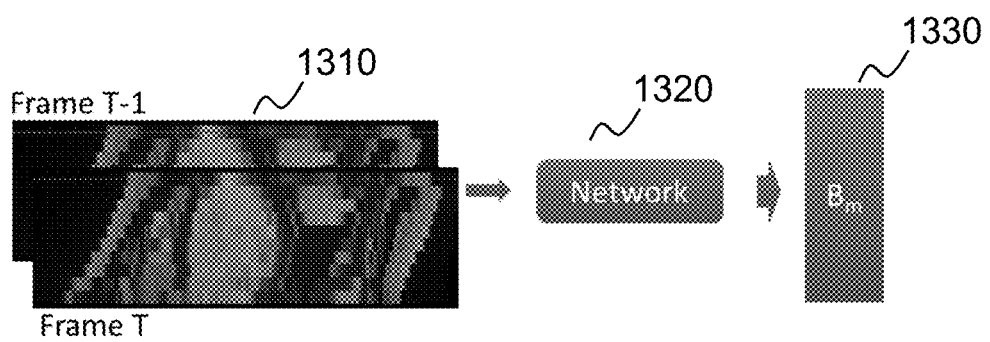
FIG. 13 is a schematic diagram illustrating a simplified scheme for determining motion parameters with a motion parameter predictive model according to some embodiments of the present disclosure.

FIG. 13 illustrates a simplified scheme for determining motion parameters with a motion parameter predictive model (MPPM) according to some embodiments of the present disclosure. As illustrated in FIG. 13, reference numeral 1310 denotes two consecutive first resolution images (e.g., LR images) corresponding to a preceding time frame N−1 and a time frame N, reference numeral 1320 denotes a network model (e.g., a CNN model-based MPPM) for predicting motion parameters regarding the input LR images, and reference numeral 1330 denotes predicted motion parameters (e.g., $B_m$). In some embodiments, the processing device may input the two consecutive first resolution images 1310 to the network model 1320, and the network model 1320 may generate the motion parameters 1330 regarding the first resolution images.

In some embodiments, the processing device may determine the motion field between the preceding image frame (e.g., the first image frame at N−1) and the current image frame (e.g., the first image frame at N) based on a coordinate difference of corresponding voxels of the two images. It should be understood that a motion field may describe point correspondence between two images (e.g., two consecutive image frames including the preceding image frame and a current image frame). The processing device may further determine the shape of the target in the current image frame by applying the determined motion field on the shape of the target in the preceding image frame (e.g., according to Equation (7)).

For the image sequence, if the shape of the target in the first image frame and all subsequent image frames are known, the processing device may, based on the motion model and the target MPPM, propagate the segmentation of the first image frame to all subsequent image frames. For example, the processing device first determines a first shape of the target in the first image frame of the image sequence, and then the processing device may determine a second shape of the target in the second image frame of the image sequence based on the first shape and a motion model (e.g., Equation (8)). In this way, the processing device may determine the shapes of the target in subsequent image frames.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, the processing device 140 may further generate a second resolution visual representations by rendering the determined shapes of the target. In some embodiments, the second resolution is higher than the first resolution. The second resolution is equal to the first resolution.

Figure 14:
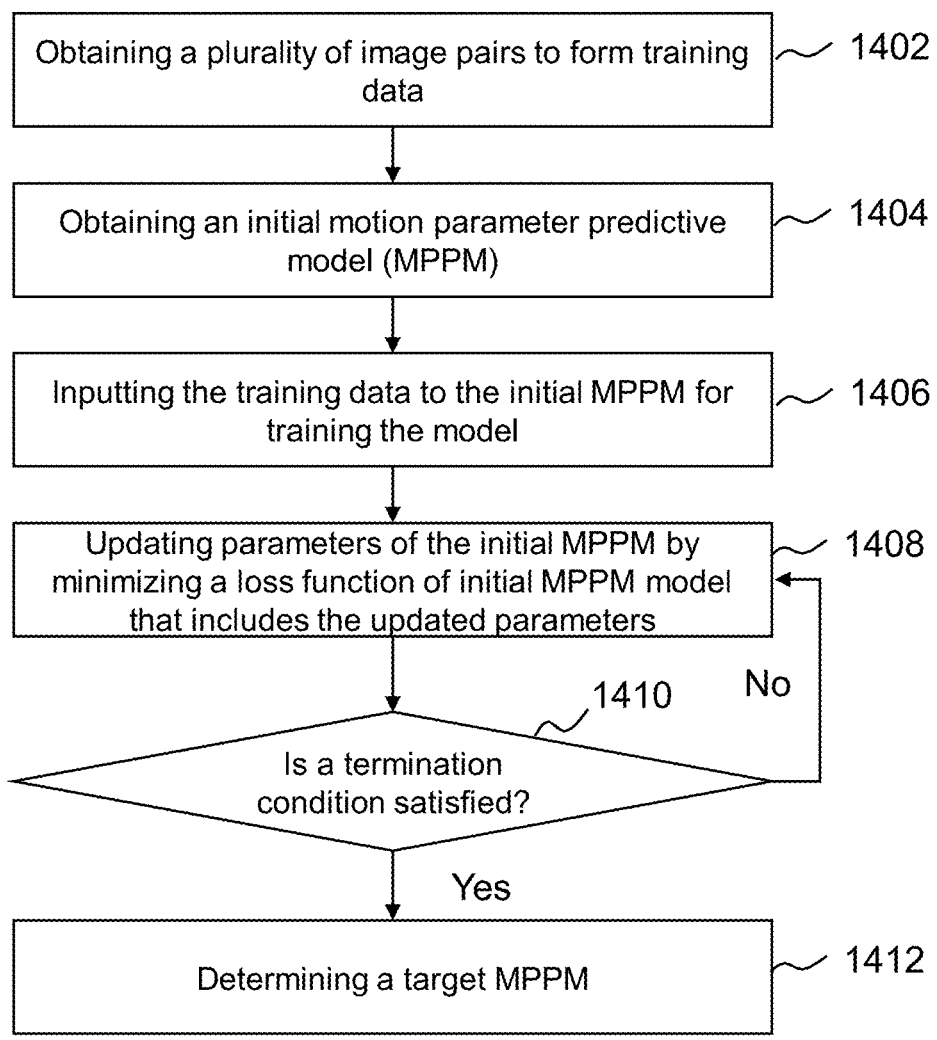
FIG. 14 is a flowchart illustrating an exemplary process for determining a predictive model for predicting motion parameters according to some embodiments of the present disclosure.

FIG. 14 is a flowchart illustrating an exemplary process for determining a target predictive model for predicting motion parameters according to some embodiments of the present disclosure. As used herein, the predictive model may be referred to as a motion parameter predictive model (MPPM). Process 1400 may be similar to process 1000. In some embodiments, process 1400 may be implemented in the imaging system 100 illustrated in FIG. 1. For example, the process 1400 may be stored in a storage device (e.g., the storage device 150, or the storage 320 of the processing device 140) as a form of instructions, and can be invoked and/or executed by the processing device 140 (e.g., the processor 310 of the processing device 140, or one or more modules in the processing device 140 illustrated in FIG. 5). The operations of the illustrated process 1400 presented below are intended to be illustrative. In some embodiments, the process 1000 may be accomplished with one or more additional operations not described, and/or without one or more of the operations discussed. Additionally, the order in which the operations of the process 1400 as illustrated in FIG. 14 and described below is not intended to be limiting.

In 1402, the processing device (e.g., the acquisition module 502 of the processing device 140) may obtain a plurality of image pairs to form training data. Each of the plurality of image pairs may include two consecutive image frames. For example, a first image frame corresponding to a first time frame M−1 and a second image frame corresponding to a second time frame M, where M is an integer that is less than or equal to 2. The plurality of image pairs may be associated with a plurality of samples. Each of the plurality of samples may include an image sequence (e.g., a cine MR image sequence) composed of a plurality of image frames. The image sequence may be from a sample subject. A sample subject may be the subject under an examination as describe in, e.g., FIG. 7 of the present disclosure, or a patient with a heart disease. The image frame may be a low-resolution (LR) image or high-resolution (HR) image. In some embodiments, the image frame may be a 2D image or 3D image (also referred as 3D volume or volumetric image). As used herein, a plurality of image sequences composed of 3D volumes may be selected as training samples. Multiple groups of image pairs from the image sequence may be classified. The multiple groups of image pairs may form a training set. In some embodiments, the training set may be stored in a storage device (e.g., the storage device 150).

In 1404, the processing device (e.g., the acquisition module 502 of the processing device 140) may obtain an initial motion parameter predictive model (MPPM). In some embodiments, the initial MPPM may be stored in a storage device as an application or a portion thereof. For example, the acquisition module 502 may obtain the initial MPPM from the storage device (e.g., the storage device 150).

The initial MPPM may be a machine learning regression model similar to the initial SPPM. Exemplary machine learning regression models may include a decision tree model, a deep learning neural network model, a regression tree model, a random forest model, gradient boosting tree, or the like, or a combination thereof. Exemplary deep learning neural network model may include a convolutional machine learning model (CNN), a fully convolutional neural network (FCN) model, a generative adversarial network (GAN), a back propagation (BP) machine learning model, a radial basis function (RBF) machine learning model, a deep belief nets (DBN), an Elman machine learning model, or the like, or a combination thereof. In some embodiments, the architecture of the initial MPPM may be the same as or similar to the architecture of the initial SPPM. For example, the initial MPPM may include multiple layers, for example, an input layer, multiple hidden layers, and an output layer. The multiple hidden layers may include one or more convolutional layers, one or more pooling layers, one or more batch normalization layers, one or more activation layers, one or more fully connected layers, a cost function layer, etc. Each of the multiple layers may include a plurality of nodes. The initial MPPM may be trained to take two consecutive image frames as inputs and the motion parameters regarding the input image frames as outputs.

Merely for illustration, the initial MPPM may be the CNN model. The architecture of the CNN model may be the same as or similar to the CNN model 1100 illustrated in FIG. 11. For example, the CNN model may include an input layer, multiple hidden layers, and an output layer. The multiple hidden layers may include one or more convolutional layers, one or more Rectified Linear Units layers (ReLU layers), one or more pooling layers, one or more fully connected layers, or the like, or a combination thereof. The training data (e.g., a plurality of image pairs) may be input to the CNN model by the input layer. The hidden layers may perform convolution operations, pooling operations, and so on. The output layer may output predicted motion parameters. More detailed descriptions of the CNN model may be found elsewhere in the present disclosure (e.g., FIG. 11, and the descriptions thereof), and not be repeated herein.

In 1406, the processing device (e.g., the second predictive model determination module 514 of the processing device 140) may input the training data to the initial motion predictive model for training the model. In some embodiments, the training data may be obtained from the acquisition module 502 or the storage device 150. For example, the second predictive model determination module 514 may obtain the training data and the initial MPPM from the acquisition module 502. The second predictive model determination module 514 may input the training data to the initial MPPM.

In some embodiments, the processing device may train the initial motion predictive model using a machine learning algorithm. Exemplary machine learning algorithm may include a gradient descent algorithm, a Newton's algorithm, a Quasi-Newton algorithm, a Levenberg-Marquardt algorithm, a conjugate gradient algorithm, or the like, or a combination thereof. For example, the model may be trained by the stochastic gradient descent (SGD) algorithm. The training process may be an iterative process. The processing device may perform one or more iterations to train the initial MPPM. The one or more iterations may be performed to update a plurality of learning parameters of the initial MPPM until a termination condition is satisfied.

In each of the one or more iterations, the processing device may, according to the SGD algorithm, update parameters of the initial MPPM to minimize a loss function of the initial MPPM that includes the updated parameters (as illustrated in operation 1408). The loss function may measure how far away an output solution (e.g., a predicted value) is from an optimal solution (e.g., a ground true). The ground truths (i.e., the true motion parameters $B_m$) regarding the training data may be prior knowledge. In some embodiments, the loss function may be a regression loss function, such as, including a mean square error (MSE) function, a mean absolute error (MAE) function, a Huber loss function, a Log-cos h loss function, a quantile loss function, or the like. For example, the MSE function (e.g., Equation (5)) may be selected as the loss function of the initial MPPM. The processing device may determine a training loss value based on the loss function in each training round. The processing device may iteratively, based on the training loss value, update the parameters of the model using the SGD algorithm until the termination condition is satisfied.

In 1410, the processing device (e.g., the second predictive model determination module 514) may determine whether the termination condition is satisfied in each training round. In some embodiments, if the termination condition is satisfied, the training process may be terminated. Operation 1412 may be proceeded. For example, in the current training round, if the training loss value of the loss function of the model that includes the updated parameters falls below a third threshold, the training process may be terminated. As another example, in the current training round, if an iteration count of the iterative process exceeds a fourth threshold, the training process may be terminated. In some embodiments, the first threshold (illustrated in operation 1010), the second threshold (illustrated in operation 1010), the third threshold and the fourth threshold may be same or different. As a further example, in the current training round, if the loss function of the model that includes the updated parameters converges, the training process may be terminated.

In 1412, when the training process is completed, the processing device (e.g., the second predictive model determination module 514) may designate the current trained MPPM as the target MPPM. In some embodiments, if the termination condition is not satisfied, a next iteration may be performed until the termination condition is satisfied.

Similar to the target SPPM, an accuracy of the designated target MPPM may also be equal to or greater than a desired accuracy threshold (e.g., 80%, 85%, 90%, etc.). The accuracy of the target MPPM may be measured by verifying a validation set. The validation set is similar to the training set for training the MPPM. The test set may include a plurality of image pairs, each of which includes two consecutive image frames. In the verification process using the validation set, if the accuracy of the target MPPM is not satisfied, the processing device may adjust the parameters of the designated target MPPM by training the model with new training data until the accuracy is deemed equal to or greater than the accuracy threshold, e.g., by a verification process.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for generating and tracking shapes of a target, the method is implemented on a computing device having at least one processor and at least one computer-readable storage medium, comprising:
   obtaining at least one first resolution image corresponding to at least one of a sequence of time frames of a medical scan;
   determining, according to a predictive model, one or more shape parameters regarding a shape of a target from the at least one first resolution image, wherein the one or more shape parameters include at least one shape variance coefficient and at least one pose transformation parameter, wherein
   the predictive model determines the at least one shape variance coefficient and the at least one pose transformation parameter simultaneously, or the predictive model includes a first predictive sub-model and a second predictive sub-model, and the determining, according to a predictive model, one or more shape parameters regarding a shape of a target from the at least one first resolution image further includes:

determining the at least one pose transformation parameter using the first predictive sub-model; and determining the at least one shape variance coefficient using the second predictive sub-model; and determining, based on the one or more shape parameters and a shape model, at least one shape of the target from the at least one first resolution image.

2. The method of claim 1, further comprising:

generating a second resolution visual representation of the target by rendering the determined shape of the target.

3. The method of claim 1, wherein the predictive model includes a machine learning regression model.

4. The method of claim 1, wherein the shape model is described via the one or more shape parameters regarding the shape of the target, a mean shape, and a first eigen vector matrix associated with a shape covariance matrix.

5. The method of claim 1, further comprising:

tracking a change of the shape of the target over time.

6. The method of claim 5, wherein the tracking a change of the shape of the target over time includes:

determining, based on a shape of the target corresponding to a preceding time frame N−1 and a motion model of the target, a shape of the target corresponding to a time frame N, wherein N is an integer equal to or greater than 2.

7. The method of claim 6, wherein the motion model of the target is described via motion parameters, a mean motion, and a second eigen vector matrix associated with a motion covariance matrix.

8. The method of claim 7, further comprising:

generating the motion parameters using a second predictive model, wherein the second predictive model is generated by training a second initial model based on a plurality of image pairs, each of the plurality of image pairs including a first first resolution (FR) image corresponding to a previous time frame M−1 and a second first resolution (FR) image corresponding to a time frame M, M being an integer equal to or greater than 2.

9. The method of claim 8, wherein the second predictive model includes a second machine learning regression model.

10. The method of claim 1, wherein the at least one pose transformation parameter includes at least one of a translation coefficient, a rotation coefficient, or a scale coefficient.

11. A system for generating and tracking shapes of a target, comprising:

at least one storage device storing executable instructions, and at least one processor in communication with the at least one storage device, when executing the executable instructions, causing the system to:

obtain at least one first resolution image corresponding to at least one of a sequence of time frames of a medical scan;

determine, according to a predictive model, one or more shape parameters regarding a shape of a target from the at least one first resolution image, wherein the one or more shape parameters include at least one shape variance coefficient and at least one pose transformation parameter, wherein the predictive model determines the at least one shape variance coefficient and the at least one pose transformation parameter simultaneously, or the predictive model includes a first predictive sub-model and a second predictive sub-model, and the determining, according to a predictive model, one or more shape parameters regarding a shape of a target from the at least one first resolution image further includes:

determining the at least one pose transformation parameter using the first predictive sub-model; and determining the at least one shape variance coefficient using the second predictive sub-model; and determine, based on the one or more shape parameters and a shape model, at least one shape of the target from the at least one first resolution image.

12. The system of claim 11, wherein the at least one processor is further configured to cause the system to:

generate a second resolution visual representation of the target by rendering the determined shape of the target.

13. The system of claim 11, wherein the predictive model includes a machine learning regression model.

14. The system of claim 11, wherein the shape model is described via the one or more shape parameters regarding the shape of the target, a mean shape, and a first eigen vector matrix associated with a shape covariance matrix.

15. The system of claim 11, wherein the at least one processor is further configured to cause the system to:

track a change of the shape of the target over time.

16. The system of claim 15, wherein to track a change of the shape of the target over time, the at least one processor is further configured to cause the system to:

determine, based on a shape of the target corresponding to a preceding time frame N−1 and a motion model of the target, a shape of the target corresponding to a time frame N, wherein N is an integer equal to or greater than 2.

17. The system of claim 16, wherein the motion model of the target is described via motion parameters, a mean motion, and a second eigen vector matrix associated with a motion covariance matrix.

18. The system of claim 17, wherein the at least one processor is further configured to cause the system to:

generate the motion parameters using a second predictive model, wherein the second predictive model includes a second machine learning regression model.

19. The system of claim 18, wherein the second predictive model is generated by training a second initial model based on a plurality of image pairs, each of the plurality of image pairs including a first first resolution (FR) image corresponding to a previous time frame M−1 and a second first resolution (FR) image corresponding to a time frame M, M being an integer equal to or greater than 2.

20. A non-transitory computer-readable medium, comprising at least one set of instructions, wherein when executed by at least one processor of a computer device, the at least one set of instructions directs the at least one processor to:

obtain at least one first resolution image corresponding to at least one of a sequence of time frames of a medical scan;

determine, according to a predictive model, one or more shape parameters regarding a shape of a target from the at least one first resolution image, wherein the one or more shape parameters include at least one shape variance coefficient and at least one pose transformation parameter, wherein the predictive model determines the at least one shape variance coefficient and the at least one pose transformation parameter simultaneously, or the predictive model includes a first predictive sub-model and a second predictive sub-model, and the determining, according to a predictive model, one or more shape parameters regarding a shape of a target from the at least one first resolution image further includes:

determining the at least one pose transformation parameter using the first predictive sub-model; and determining the at least one shape variance coefficient using the second predictive sub-model; and determine, based on the one or more shape parameters and a shape model, at least one shape of the target from the at least one first resolution image.

* * * * *